United States Patent
Jain et al.

(10) Patent No.: US 12,430,294 B1
(45) Date of Patent: *Sep. 30, 2025

(54) DATA MAINTENANCE TRANSACTION ROLLBACKS

(71) Applicant: Databricks, Inc., San Francisco, CA (US)

(72) Inventors: Prakhar Jain, Sunnyvale, CA (US); Bart Samwel, Oegstgeest (NL); Burak Yavuz, San Francisco, CA (US)

(73) Assignee: Databricks, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/806,557

(22) Filed: Aug. 15, 2024

Related U.S. Application Data

(63) Continuation of application No. 17/580,475, filed on Jan. 20, 2022, now Pat. No. 12,072,843.

(51) Int. Cl.
*G06F 16/174* (2019.01)

(52) U.S. Cl.
CPC .................................. *G06F 16/174* (2019.01)

(58) Field of Classification Search
CPC .................................................... G06F 16/174
See application file for complete search history.

(56) References Cited

U.S. PATENT DOCUMENTS

| | | | |
|---|---|---|---|
| 8,402,061 B1* | 3/2013 | Briggs | G06F 16/25 707/706 |
| 9,063,666 B2* | 6/2015 | Amir | G06F 16/2228 |
| 10,176,240 B2 | 1/2019 | Weisberg et al. | |
| 11,609,901 B2 | 3/2023 | Wong et al. | |
| 12,072,843 B1* | 8/2024 | Jain | G06F 16/174 |
| 2008/0052680 A1* | 2/2008 | Thebes | G06F 11/366 717/124 |
| 2011/0238716 A1* | 9/2011 | Amir | G06F 3/0643 711/111 |
| 2020/0012734 A1 | 1/2020 | Lee et al. | |
| 2023/0034426 A1 | 2/2023 | Kati et al. | |

* cited by examiner

*Primary Examiner* — Angelica Ruiz
(74) *Attorney, Agent, or Firm* — Fenwick & West LLP

(57) ABSTRACT

The present application discloses a method, system, and computer system for managing a data in a storage system. The method includes receiving a first transaction that modifies or deletes first data stored in a storage system, determining that the first data is subject to an intervening re-arrangement transaction, and in response to determining that the first data is subject to the intervening re-arrangement transaction, rolling back the re-arrangement transaction at least with respect to the first data and committing the first transaction.

20 Claims, 11 Drawing Sheets

DATA MAINTENANCE TRANSACTION ROLLBACKS

CROSS REFERENCE TO RELATED APPLICATIONS

This application is a continuation of prior, co-pending U.S. Application No.:, 17/580,475, filed on Jan. 20, 2022, which is incorporated herein by reference in its entirety for all purposes.

BACKGROUND OF THE INVENTION

A system for big data processing comprises a system for deployments of applications, configurations, one or more datasets, and model(s) used in connection with analyzing the data. Various cloud services deploy clusters to store and process data, to process queries, and to provide services to various users. As the cloud service scales the storage requirements increase significantly and the reduction of transaction failures becomes more important. As the cloud service scales, the data store accumulates data that may be inefficiently stored (e.g., duplicative files, fragmented storage, a large number of smaller files storing the same type of information rather than a fewer number of larger files storing such information, etc.). Accordingly, systems often implement storage cleanup processes to improve the storage of files across datasets. This creates a problem of increased transaction failures because of the likelihood that a cleanup process and a transaction impact a same set of file(s).

BRIEF DESCRIPTION OF THE DRA WINGS

Various embodiments of the invention are disclosed in the following detailed description and the accompanying drawings.

DETAILED DESCRIPTION

Figure 1:
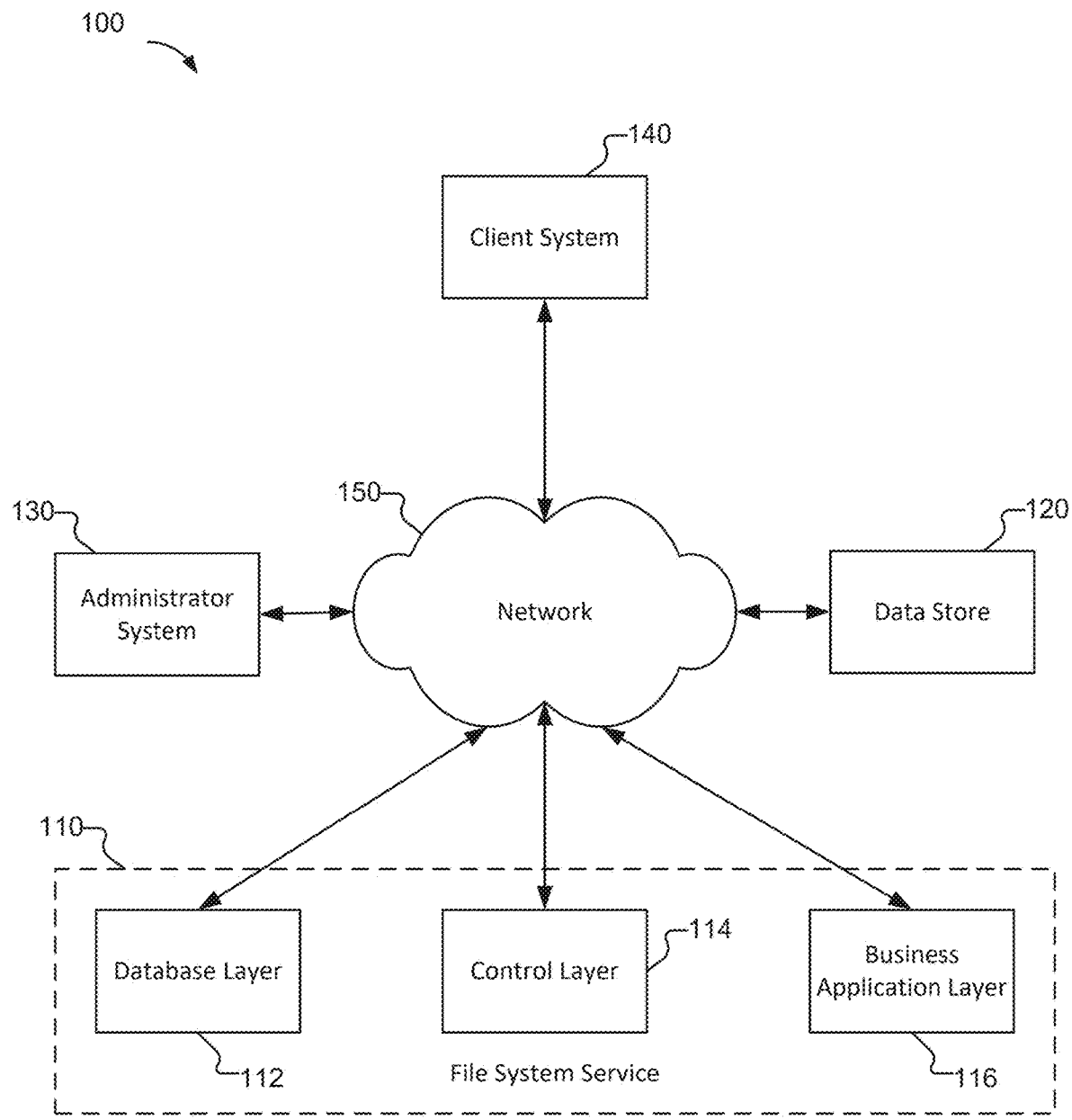
FIG. 1 is a block a diagram of a file system service for compacting information according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, rolling back a particular transaction comprises reversing a transaction or otherwise rendering a transaction void (at least partially). For example, the rolling back the particular transaction comprises reverting a dataset to a state before (e.g., immediately before) the particular transaction was performed, such reversion being with respect to at least a subset of information impacted by the particular transaction, such as part of the information compacted with other information to obtain a single file, etc.

According to various embodiments, a system, method, and/or device for storing and managing data, and/or managing a compaction or re-arrangement of data stored in a dataset is disclosed. The system comprises one or more processors and a memory. The one or more processors are configured to (i) receive a first transaction that modifies or deletes a first data stored in a storage system, (ii) determine that the first data is subject to an intervening re-arrangement transaction, and (iii) in response to determining that the first data is subject to the intervening re-arrangement transaction rollback the re-arrangement transaction at least with respect to the first data, and commit the first transaction.

According to various embodiments, the system performs a re-arrangement (e.g., one or more compaction operations or a re-arrangement transaction, etc.) with respect to data (e.g., one or more files) comprised in a dataset (e.g., and corresponding records in an index for the dataset). The system may automatically perform the re-arrangement operations, such as according to a particular frequency (e.g., a preset frequency) and/or in response to a determination that a dataset or a set of files comprised in the dataset satisfy one or more preset conditions (e.g., a density of files, a number of files, a threshold number or percentage of files being smaller than a threshold size, etc.). In some embodiments, compaction compacts multiple files together without changing the order or distribution over files, i.e., it takes N files and writes out 1 file. In some embodiments, re-arrangements take N files and write out M files (M may even be larger than N), where the records from one input file may end up spread out over different output files based on some criteria. In various embodiments, re-arrangements take multiple files as input and distribute the individual records over one or more output files based on some criteria, such as value-based partitioning, lexicographically sorted order, multidimensional clustering, or any other method to determine a distribution of records that improves access performance. In various embodiments, re-arrangement comprises: re-arrangement for the purpose of data clustering, using clustering algorithms such as multidimensional clustering (using Z-curve, hilbert curve, space-dividing trees such as k-d trees, or other spatial clustering methods), sorting, range partitioning, or hybrids of such methods; re-arrangement for the purpose of unused data removal such as the removal of tombstones for previously deleted data, or the removal of data columns that have been removed from the table schema; re-arrangement to modify the file format, encoding, file-internal indexes or clustering; re-arrangement to split large files into smaller ones; re-arrangement to move data to different storage systems, such as to reduce cost for storing infrequently accessed data, or to increase performance for frequently accessed data, or to change the geographic location; re-arrangement to create redundantly stored copies of the data, which could have different storage properties or arrangement; re-arrangements that combine multiple of these changes in a single operation, or any other appropriate re-arrangement. According to various embodiments, a compaction comprises the reduction of the number of data elements (e.g., files) in a dataset, or the moving of allocated blocks in a memory to reduce fragmentation of elements in the memory. As an example, compaction comprises combining two files that are relatively small into a single relatively larger file. As another example, if the dataset stores two files each comprising information for a relatively small number of bank accounts (e.g., less than or equal to 5 bank accounts), querying a cloud storage (e.g., a remote data store comprising the dataset) to obtain each file is inefficient whenever information for a particular bank account is to be accessed; thus, compacting the information of the two files into a single file improves the efficiency with which information is accessed from a dataset (e.g., it is more efficient to have a single file with more records). In some embodiments, in connection with the compaction or re-arrangement with respect to a set of files, an index is updated to reflect a new location at which the corresponding data is found in the dataset (e.g., a location of a file input to a compaction or re-arrangement operation is updated to comprise the location of the output from the compaction or re-arrangement operation, etc.). The compaction or re-arrangement may be performed according to a predefined schedule and/or triggering conditions. For example, the system may store one or more compaction or re-arrangement policies indicating a schedule and/or conditions used in connection with invoking a compaction or re-arrangement.

As a system performs a compaction (e.g., a set of compaction operations) or other re-arrangement with respect to a set of files (or other data elements) in a dataset, the system may receive inbound queries for, or otherwise attempt to perform an operation (e.g., a business transaction) with respect to, a record comprised in the set of files being subject to compaction or other re-arrangement. For example, the system receives a query for, or otherwise attempt to perform an operation with respect to, the file comprised in the set of files contemporaneous with the system performing compaction or other re-arrangement with respect to the set of files. As an example, the query or other attempt to perform the operation with respect to the file conflicts with the compaction or other re-arrangement being performed. Accordingly, a business transaction directed to modifying/changing the record contemporaneous (e.g., simultaneous) with a compaction or other re-arrangement including the file will fail to commit the business transaction (e.g., at least with respect to the file resulting from the compaction or other re-arrangement). The failure to commit the business transaction is generally an inconvenience to a user (e.g., the user attempting to modify the file). The compaction or other re-arrangement may be performed according to one or more conditions such as a transaction to combine a set of files in to a threshold size (e.g., to obtain a compacted file having maximum size such as 1 GB, and/or to obtain a compacted file having a minimum size, etc.). In some embodiments, the system performs compaction or other re-arrangement according to a batch process. For example, the system determines to perform a plurality of compactions or other re-arrangement transactions in a batch. As another example, the system queues a compaction or other re-arrangement until a condition for performing a batch of compactions or other re-arrangements.

An example of a conflict between a business transaction is as follows: at time=t0, a business transaction is invoked; at time=t1, an automatic compaction operation starts and commits a compaction of file A and file B to obtain file C; at time=t2, the business transaction attempts to delete file A and write file A'. However, because file A had already been compacted to file C, the deletion of file A would conflict and thus fail unless the compaction operation is rolled back. File C can be deconstructed to obtain file A and file B, then file A can be deleted and file A' can be written in accordance with the business transaction. Thereafter, the system may re-compact file A' and file B to obtain file C'.

According to various embodiments, the system stores a log or set of one or more other files stored in a dataset table (collectively referred to herein as the "log") comprising a set of transactions, or a sequence of transactions, performed with respect to a dataset. The log stores an indication of a set of files involved in a corresponding transaction (e.g., a compaction, a re-arrangement, a business transaction, etc.). For example, the log may store a mapping of the information subject to the compaction or other re-arrangement. The log may thus track the compaction or other re-arrangement and/or flow of transactions/files in a dataset. The log may be stored in a cloud storage such as a remote data store on which the dataset is stored. The log may include an identifier or indication of an order in which the transactions are performed. For example, a file number or transaction number may be used in connection with determining an order in which transactions are performed. The log is updated in connection with performing an operation. Accordingly, the log comprises information corresponding to a compaction or other re-arrangement operation (e.g., the log indicates that certain information was moved out of one or more files and that such information was moved to another file). As an example, if the dataset comprises a plurality of files with a relatively small number of records, the files may be compacted to a single file comprising the records of the plurality of files. The log may be used to reconstruct/revert a dataset to an earlier date/time. For example, the system may use the log to determine a set of transactions to reverse in connection with configuring the dataset to a state corresponding to such earlier date/time. An example of a context according to which the system determines to reverse a set of transactions (e.g., to revert a state of at least part of the dataset to an earlier date/time) is in connection with conflicting business transactions and compaction or other re-arrangement operations.

A dataset may be accessed by different users such as in connection with system processes (e.g., background maintenance processes such as compaction operations), servicing user queries, etc. As an example, two different subsets of actors may be respectively running from different compute clusters of a system. Each actor acting on the data of the dataset may not be alerted/privy to the actions of another actor. Accordingly, the actions of the different actors may conflict such as to the extent that two actions from two actors are requested/performed at the same time with respect to the same information. In some embodiments, in response to receiving a request/indication to perform a transaction, the system determines whether the transaction conflicts with another transaction (e.g., another contemporaneous/intervening transaction), etc. For example, in response to receiving a request to perform a transaction, the system performs a lookup with respect to the log to determine whether information of the dataset that is impacted by the transaction is otherwise subject to another intervening transaction.

According to various embodiments, a compaction or other re-arrangement is rolled back at least with respect to information (e.g., a particular file) in response to a determination that a business transaction affecting the information conflicts with the compaction or other re-arrangement. In some embodiments, the system determines whether a business transaction conflicts with a compaction such as an ongoing compaction or other re-arrangement, or a scheduled compaction or other re-arrangement. For example, the system determines information associated with the business transaction (e.g., information subject to the business transaction, such as data being modified or otherwise accessed), and determines whether such information is subject to a compaction or other re-arrangement. In some embodiments, in response to receiving a business transaction, the system performs a lookup with respect to the log to determine whether the information associated with the business transaction is subject to an intervening transaction since the business transaction was received. For example, the system uses the log in connection with determining whether a conflict exists with respect to the business transaction (e.g., the system determines whether at least part of the information impacted by the business transaction matches at least part of the information of a compaction, such as a re-arranging transaction).

According to various embodiments, in response to determining that information impacted by the business transaction (e.g., one or more files) matches (e.g., is the same as, conflicts with, etc.) information impacted by an intervening compaction or other re-arrangement, the system determines whether to roll back the compaction or other re-arrangement. As an example, the system may determine to roll back the compaction or other re-arrangement based at least in part on one or more conflict policies (or rollback policies). The one or more conflict policies may be set and/or configurable by a user such as a system administrator, an administrator of a customer, etc. As another example, the system rolls back the compaction or other re-arrangement by default in response to determining that the business transaction conflicts with an intervening transaction (e.g., the compaction or other re-arrangement). In some embodiments, the one or more conflict policies are used to determine priorities of particular transactions (e.g., business transaction, re-arrangement transactions, etc.). The respective priorities of conflicting transactions may be used to determine whether to commit a particular transaction and/or whether to roll back a compaction or other re-arrangement. For example, the respective priorities may be used for conflict resolution between the business transaction and the compaction or other re-arrangement. As an example, if a business transaction is deemed to have a relatively higher priority than a compaction or other re-arrangement, the system determines to roll back the compaction or other re-arrangement (e.g., at least part of the compaction or other re-arrangement) and to commit the business transaction. As another example, if a business transaction is deemed to have a relatively lower priority than a compaction or other re-arrangement, the system determines to not roll back the compaction or other re-arrangement (e.g., and to cause the business transaction to fail, etc.). In some embodiments, the cost of or the redoing of the business transaction vs. cost of (redoing of) the rearrangement transaction, combined with the question whether the business transaction can be safely retried are considered in determining priority for transaction. In some embodiments, a priority corresponding to a transaction is set based at least in part on one or more of a type of transaction, a type of information impacted by the transaction, a directory in which the information impacted by the transaction is stored, a dataset to which information impacted by the transaction belongs, etc. Various other attributes may be used to set priorities for transactions (e.g., attributes of the transaction, information impacted by the transaction, the presence and number of preceding failed attempts of executing the transaction, etc.).

According to various embodiments, the system prompts a user in connection with confirming or authorizing rollback of a compaction transaction. In some embodiments, the system automatically performs the rollback without prompting a user. The system may determine that certain information is impacted by a business transaction and that such information is subject to an intervening re-arrangement transaction(s) (e.g., a compaction operation). In response to determining that a rollback is to be performed in order to commit the business transaction, the system prompts the user to confirm or authorize the rollback of the intervening re-arrangement transaction(s). For example, the system causes a client terminal to display a prompt alerting the user that a business transaction impacts information that has been subject to an intervening re-arrangement transaction, and providing selectable elements via which the user can select whether to accept or decline the rollback transaction. As an example, the user corresponds to the user that requested the business transaction. As another example, the user corresponds to an administrator.

According to various embodiments, the system determines whether to perform a rollback based at least in part on a rollback threshold. The rollback threshold may correspond to an extent to which the overall state of the dataset is impacted by a rollback threshold. For example, the compaction operation improves the efficiency of the dataset. Accordingly, rolling back a compaction loses the efficiencies. In some embodiments, if the state of the dataset is impacted more than the rollback threshold, the system determines not to perform the rollback transaction and to cause the business transaction to fail. The system may provide an indication to a user to notify the user that the business transaction failed and/or prompting the user to retry the business transaction (e.g., which may be performed with respect to the information in the compacted file, etc.).

In connection with determining to rollback a compaction, the system may determine an extent to which the compaction is rolled back. For example, the system may fully rollback the compaction (e.g., the re-arrangement transaction). As another example, the system may partially rollback the compaction. As an example, if the system determines to compact file A, file B, and file C, then a file D is obtained (e.g., A+B+C→D), and an index for the dataset may be updated to remove records for files A, B, C, and to add a record for file D. In the case of a full rollback of the compaction, the compaction of file A, file B, and file C in order to obtain file D is voided (e.g., D→A+B+C), and files A, B, and C are obtained and/or an index of files for the dataset is updated to include a record (e.g., a location for) files A, B, and C, and to remove a record for file D. In the case of a partial rollback of the compaction where the business transaction impacts file B, the compaction of file A, file B, and file C in order to obtain file D is partially voided (e.g., D→D'+B), and file D' (e.g., corresponding to files A and C, as compacted) and file B is obtained and/or an index of files for the dataset is updated to include a record (e.g., a location for) file B. Although the partial rollback of the compaction (e.g., of file D to D') may be suboptimal (e.g., with respect to the conditions that may have initially triggered the compaction), a subsequent compaction process may pick-up/resolve suboptimal file D' (e.g., file D' may be further compacted with another file in a subsequent compaction, etc.). The extent to which the compaction is rolled back may be determined based at least in part on the information subject to the conflict (e.g., the information impacted by the business transaction, the information of the compaction giving rise to the conflict, etc.).

The system may determine the extent of a rollback (or whether to perform a rollback) based at least in part on the log. In some embodiments, the system performs a lookup in the log with respect to the set of files comprised in a compacted file for which the system is determining the extent of the rollback. The system may determine whether any intervening transactions have been committed since the compaction that impacts the compaction (e.g., that may cause the rollback of the compacted file to fail). For example, if file A and file B are compacted to obtain file C, and another transaction subsequently (or contemporaneously) rewrites a file B (e.g., after the compaction is committed), then rollback of file C to obtain file B would fail because a new file B already exists. A partial rollback of file C to obtain file A (e.g., C→A+C') while maintaining C' (e.g., corresponding to file B) may be possible.

In some embodiments, the compaction has committed and another transaction has already consumed its output. For example, 1) a first business transaction starts; 2) a compaction compacts A+B=>C; 3) a second business transaction deletes C and writes C'; and 4) the first business transaction wants to delete A and write D. In this case, the rollback of the compaction transaction from step (2) is prohibited because the second business transaction from step (3) has already deleted the_output_of the compaction. And if the output is no longer present, then it cannot be rolled back.

In some embodiments, in connection with determining to rollback a compaction, the system determines to re-compact the files using the information as modified by the business transaction. For example, the system determines to temporarily rollback the compaction and to re-apply the compaction using the then-current (e.g., the modified) information. The re-compaction may be automatically performed in response to a determination that the business transaction with which the compaction conflicts is committed. As an example, if the system determines to compact file A, file B, and file C, then a file D is obtained (e.g., A+B+C→D). If a business transaction is received and the system determines that the business transaction impacts file A, then the system determines to roll back the compaction to obtain file A, file B, and file C. The system may also correspondingly update the index for the dataset. In response to a determination that the rollback of the compaction is successful, the business transaction is committed, and file A is modified to obtain file A' (e.g., A→A'). In response to determining that that the business transaction is committed, the compaction is reapplied using files A', file B, and file C, and a file D' is obtained (e.g., A'+B+C→D'). As an example, file A may be made up of parts x and y, and the business transaction may render file A (e.g., creates file A') to include parts p and q.

In some embodiments, the system determines to perform a plurality of rollback transactions (e.g., to rollback a plurality of compactions) such as in connection with performing a business transaction. As an example, if the system determines to compact file A, file B, and file C, then a file D is obtained (e.g., A+B+C→D); and the system determines to compact file D, file E, and file F, then file G is obtained (e.g., D+E+F→G). If a business transaction is received and the system determines that the business transaction impacts file E, then system rolls back compaction of G (e.g., either fully or partially) to obtain file E. In contrast, if a business transaction is received and the system determines that the business transaction impacts file C, then the system rolls back compaction of G (e.g., either fully or partially) to obtain file D, and then further rolls back compaction of D (e.g., either fully or partially) to obtain file C. The system may use the log to determine the intervening compactions to rollback in order to commit a business transaction, and the system may use one or more conflict policies (or rollback policies, etc.). In some embodiments, the system determines to perform a plurality of rollback transactions, a first subset of the rollback transactions being full rollback transactions, and a second subset of the rollback transactions being partial rollback transactions. A partial rollback is beneficial because the system does not lose its progress (e.g., efficiencies obtained by compaction) with respect to all the other files that are not impacted by the business transaction or rollback transaction.

In some embodiments, the system performs a compaction according to a preset compaction threshold. For example, if the system compacts a large number of files to create a relatively compacted file, the system may lose all the efficiencies of such compaction if even a single file within the compacted file is subject to a rollback in order to a commit a business transaction that impacts such single file. In some embodiments, the compaction threshold is set based at least in part on historical information such as historical information pertaining to rollback transactions (e.g., a statistical analysis of an optimal compaction size to minimize/reduce rollback transactions, etc.). In some embodiments, the compaction threshold is set according to a policy set by a user such as an administrator.

According to various embodiments, a compaction of a set of input files to obtain a compacted file does not comprise contemporaneous deletion of the input files. In some embodiments, the system updates an index for the dataset to update a location of the information corresponding to the file. For example, in the case of a compaction of file A and file B to obtain compacted file C, the system updates an index with respect to information comprised in file A to point towards the location of file C, and updates the index with respect to information comprised in file B to point towards the location of file C. If the system rolls back the compacted file C to obtain file A and file B, the reconstitution of file A and file B may correspond to an update to the index to a location with respect to information comprised in file A to point towards the location of file A (e.g., the location of the input file corresponding to file A, which had not been deleted contemporaneous with compaction). As an example, the system may not have to recreate file A in connection with a rollback operation to obtain file A. In some embodiments, the system maintains (e.g., keeps in storage) input files used to obtain compacted files while active transactions are alive. In response to a determination that all active transactions are no longer alive (and thus that there are no active transactions expecting to be able to commit an operation with respect to an input file), the system may flush the corresponding files. In some embodiments, the system maintains the input files used to obtain compacted files for a threshold period of time (e.g., 24 hours, 7 days, etc.). The threshold period may be set by a customer, an administrator, an organization's policy, etc.

FIG. 1 is a block diagram of a file system service for compacting information according to various embodiments of the present application.

In the example illustrated in FIG. 1, system 100 includes file system service 110, data store 120, administrator system 130, and/or client system 140. In some embodiments, file system service 110 and data store 120 are integrated (e.g., combined into a layer or a single set of server(s)). In some embodiments, file system service 110 comprises database layer 112, control layer 114, and/or business application layer 116. System 100 further includes one or more networks such as network 150 over which administrator system 130 and/or client system 140 communicates with file system service 110 and/or data store 120. In various embodiments, network 150 includes one or more of a wired network, and/or a wireless network such as a cellular network, a wireless local area network (WLAN), or any other appropriate network. In some embodiments, database layer 112, control layer 114, and/or business application layer 116 are respectively implemented by one or more servers. System 100 may include various other systems or terminals.

According to various embodiments, file system service 110 comprises database layer 112, control layer 114, and/or business application layer 116. File system service 110 uses database layer 112 to store one or more files to a dataset such as a dataset stored on data store 120. File system service 110 also uses database layer 112 to manage (e.g., store, update, etc.) an index of information stored in a dataset (e.g., a mapping of files to locations at which the files are stored, etc.). Database layer 112 services queries received in connection with a user analyzing, or searching for, a file stored in a dataset and/or information comprised in a log of transactions with respect to files in the dataset. File system service 110 uses control layer 114 as a control plane for a set of one or more files stored in database layer 112 and the information pertaining to the set of one or more files, such as metadata for the file(s), a mapping of files to locations (e.g., storage locations) and/or a history of operations performed with respect to the files (e.g., a log of transactions performed with respect to a file).

Control layer 114 receives an indication that a business transaction is attempting to impact (e.g., access, delete, modify, etc.) a file, such as a file stored in a dataset on data store 120. Control layer 114 determines whether to perform a conflict resolution (e.g., to perform a rollback of a compaction or other re-arrangement operation, etc.) with respect to such business transaction. For example, control layer 114 determines whether the file subject to the business transaction has been impacted by a compaction (e.g., an intervening re-arrangement transaction, etc.). In response to determining that the file subject to the business transaction has been impacted by a compaction or other re-arrangement, control layer 114 determines whether to rollback the compaction or other re-arrangement (e.g., to commit the business transaction).

According to various embodiments, control layer 114 receives a first transaction (e.g., a business transaction) that modifies or deletes a first file stored in data store 120, determines that the first file is subject to an intervening re-arrangement transaction (e.g., the first file is subject to a compaction or other re-arrangement operation), and in response to determining that the first file is subject to the intervening re-arrangement transaction, control layer 114 rolls back the re-arrangement transaction at least with respect to the first file, and commits the first transaction.

In some embodiments, file system service 110 (e.g., control layer 114) performs a compaction or other re-arrangement with respect to one or more files comprised in a dataset stored at data store 120. As an example, control layer 114 automatically performs the compaction or other re-arrangement in response to a determination that one or more conditions are satisfied (e.g., triggered). Examples of the one or more conditions include: (i) a particular time period has lapsed (e.g., compaction or other re-arrangement is performed at a predetermined frequency) since a last compaction or other re-arrangement, (ii) a dataset or a set of files comprised in the dataset satisfy one or more preset conditions (e.g., a density of files, a number of files, a threshold number or percentage of files being smaller than a threshold size, etc.), and (iii) a threshold number of compaction or other re-arrangement operations are queued. Various other conditions (or combinations thereof) may be implemented. In some embodiments, the one or more conditions (or at least a subset thereof) are defined in one or more compaction policies.

In some embodiments, file system service 110 (e.g., database layer 112) stores a log or set of one or more other files stored in a dataset table comprising a set of transactions, or a sequence of transactions, performed with respect to a dataset such as a dataset stored at data store 120. The log stores an indication of a set of files involved in a corresponding transaction (e.g., a compaction, a business transaction, etc.). For example, the log stores a mapping of the information subject to the compaction. In some embodiments, the log includes an identifier or indication of an order in which the transactions are performed. For example, a file number or transaction number is used in connection with determining an order in which transactions are performed. File system service 110 updates the log in connection with a performing an operation (e.g., the log is updated contemporaneously with performing the operation with respect to a particular file). In some embodiments, control layer 114 uses the log to reconstruct/revert a dataset to an earlier date/time. For example, control layer 114 uses the log to determine a set of transactions to reverse in connection with configuring the dataset to a state corresponding to such earlier date/time. An example of a context according to which control layer 114 determines to reverse a set of transaction (e.g., to revert a state of at least part of the dataset to an earlier date/time) is in connection with conflicting business transactions and compaction or other re-arrangement operations.

Control layer 114 determines to rollback a compaction or other re-arrangement (e.g., at least with respect to a particular file that was subject to compaction or other re-arrangement) in response to determining that a business transaction affecting the information conflicts with the compaction. As an example, control layer 114 receives a business transaction (or invocation of such) from business application layer 116, such as in connection with executing an application, receiving a query, etc. In response to receiving the business transaction, control layer 114 determines whether any intervening compaction or other re-arrangement was performed with respect to information (e.g., one or more files) impacted by the business transaction. In some embodiments, in response to receiving a business transaction, control layer 114 performs a lookup with respect to the log to determine whether the information associated with the business transaction is subject to an intervening transaction since the business transaction was received. For example, control layer 114 uses the log in connection with determining whether a conflict exists with respect to the business transaction.

In response to determining that information impacted by the business transaction (e.g., one or more files) matches (e.g., is the same as, conflicts with, etc.) information impacted by an intervening compaction or other re-arrangement, file system service 110 (e.g., control layer 114) determines whether to rollback the compaction or other re-arrangement. In some embodiments, file system service 110 determines whether to rollback the compaction or other re-arrangement based at least in part on one or more conflict policies (or rollback policies). Examples of the one or more conflict policies include one or more of: (i) rolling back the compaction or other re-arrangement by default in response to detecting a conflict between a business transaction and an intervening compaction or other re-arrangement, (ii) rolling back the compaction or other re-arrangement provided that the extent of a change in the state of the dataset does not exceed a predetermined rollback threshold, (iii) allowing a business transaction to fail in response to a determination that the extent of a change in the state of the dataset exceeds (or is equal to) a predetermined rollback threshold, (iv) prompting a user to confirm or authorize a proposed compaction or other re-arrangement that is determined in response to detection of the conflict between a business transaction and an intervening compaction or other re-arrangement, (v) using the relative priorities corresponding to the business transaction and the compaction or other re-arrangement, and using a higher priority to determine which transaction to commit, (vi) a threshold number (or percentage) of files that were subject to compaction or other re-arrangement are deemed to be impacted by the one or more business transactions and thus subject to rollback, etc. Various other policies or conditions may be implemented in connection with the one or more conflict policies.

According to various embodiments, file system service 110 (e.g., control layer 114) determines an extent to which to rollback a compaction. For example, in response to control layer 114 determining to rollback a compaction or other re-arrangement, control layer 114 then determines an extent to which the compaction or other re-arrangement is to be rolled back, such as using a partial rollback, or a full rollback, etc. In some embodiments, control layer 114 uses the one or more conflict policies. In some embodiments, control layer 114 determines to perform a plurality of rollback transactions, including a first subset of the rollback transactions that correspond to full rollback transactions, and a second subset of the rollback transactions that correspond to partial rollback transactions. A partial rollback is beneficial because the system does not lose its progress (e.g., efficiencies obtained by compaction or other re-arrangement) with respect to all the other files that are not impacted by the business transaction or rollback transaction. In some embodiments, file system service 110 determines an extent to which to rollback the compaction or other re-arrangement based at least in part on the information (e.g., the set of one or more files) that are impacted by the business transaction(s) and/or information deemed to be in conflict between the business transaction(s) and the compaction(s) or other re-arrangement(s). As an example, file system service 110 uses the log in connection with determining an extent of the rollback. File system service 110 uses the log to determine the set of files impacted by both the business transaction(s) and the compaction(s) or other re-arrangement(s). In some embodiments, file system service 110 uses the log to determine a set of transactions and/or files that are in conflict if a compaction or other re-arrangement is to be rolled back (e.g., if an intervening transaction has re-written a file or uses a file name of a file that was subject to compaction or other re-arrangement).

In some embodiments, file system service 110 updates an index based on a compaction or other re-arrangement and/or a rollback of the compaction or other re-arrangement. The index is updated to comprise the appropriate mapping of files to locations at which the files are stored.

According to various embodiments, control layer 114 provides a user interface via which a user discovers and/or accesses one or more files stored in database layer 112, to set one or more conflict policies or compaction or other re-arrangement policies (e.g., a compaction or other re-arrangement threshold, etc.), and/or to confirm or authorize a proposed rollback (or proposed denial of rollback), etc. As an example, the web interface is provided as a web service such as on a page accessed by a user via administrator system 130 and/or client system 140. In some embodiments, control layer 114 mediates access to a file stored in database layer 112.

According to various embodiments, business application layer 116 provides an interface via which a user (e.g., using client system 140) may interact with various applications such as a development application for developing a feature or model for analyzing the data stored in the data store 120, an application to access files stored in a dataset (e.g., a dataset stored in data store 120), an application to perform dataset cleanup such as compaction or other re-arrangement operations, an etc. In some embodiments, application layer 116 provides an interface via which a user can update or delete parts of data based on predicates. Various other applications can be provided by business application layer 116. For example, a user queries database layer 112 by sending a query/request to business application layer 116, which interfaces with database layer 112 to obtain information responsive to the query (e.g., business application layer 116 formats the query according to the applicable syntax and send the formatted query to database layer 112). As another example, an administrator uses an interface provided/configured by business application layer 116 to configure (e.g., define) one or more security policies include access permissions to files and/or one or more policies pertaining to compaction or other re-arrangement (e.g., compaction or other re-arrangement policies) and/or rollbacks of compactions or other re-arrangements (e.g., conflict policies).

According to various embodiments, data store 120 stores raw data such as source data or records. For example, data and/or records that are used to determine a feature or in applying a model. Data store 120 stores one or more files pertaining to a dataset.

According to various embodiments, system 100 comprises an administrator system 130 for use by an administrator such as an administrator of file system service 110. For example, administrator system 130 comprises a system for communication, data access, computation, etc. An administrator uses administrator system 130 to maintain data store 120 (e.g. maintain raw data or files comprised in data store 120) and/or one or more policies or thresholds (e.g., compaction thresholds, compaction policies indicating a context in which to perform a compaction, rollback policies indicating a context in which to perform a rollback, etc.). In some embodiments, administrator system 130 communicates with file system service 110 via a web-interface. For example, administrator system 130 communicates with file system service 110 via a web-browser installed on administrator system 130. As an example, administrator system 130 communicates with file system service 110 via an application running on administrator system 130. In some embodiments, administrator system 130 communicates with file system service 110 via a REST API or some other protocol.

According to various embodiments, system 100 comprises client system 140. Client system 140 is used by a user (e.g., a developer such as a developer of a feature, a developer of a model, etc.) to communicate with file system service 110 and/or data store 120. As an example, client system 140 communicates with file system service 110 via a web-interface. In some embodiments, a user uses client system 140 to modify a file at data store 120, to update one or more policies stored at file system service 110, to query database layer 112, etc.

In some embodiments, database layer 112, control layer 114, and/or business application layer 116 are implemented on a single server or a plurality of servers. For example, control layer 114 and database layer 112 are different modules running on a same server or set of servers. For example, the system disclosed may or may not be running as part of modules on the same server or set of servers. In some embodiments, file system service 110, and/or data store 120 are implemented on a single server or a plurality of servers.

Figure 2:
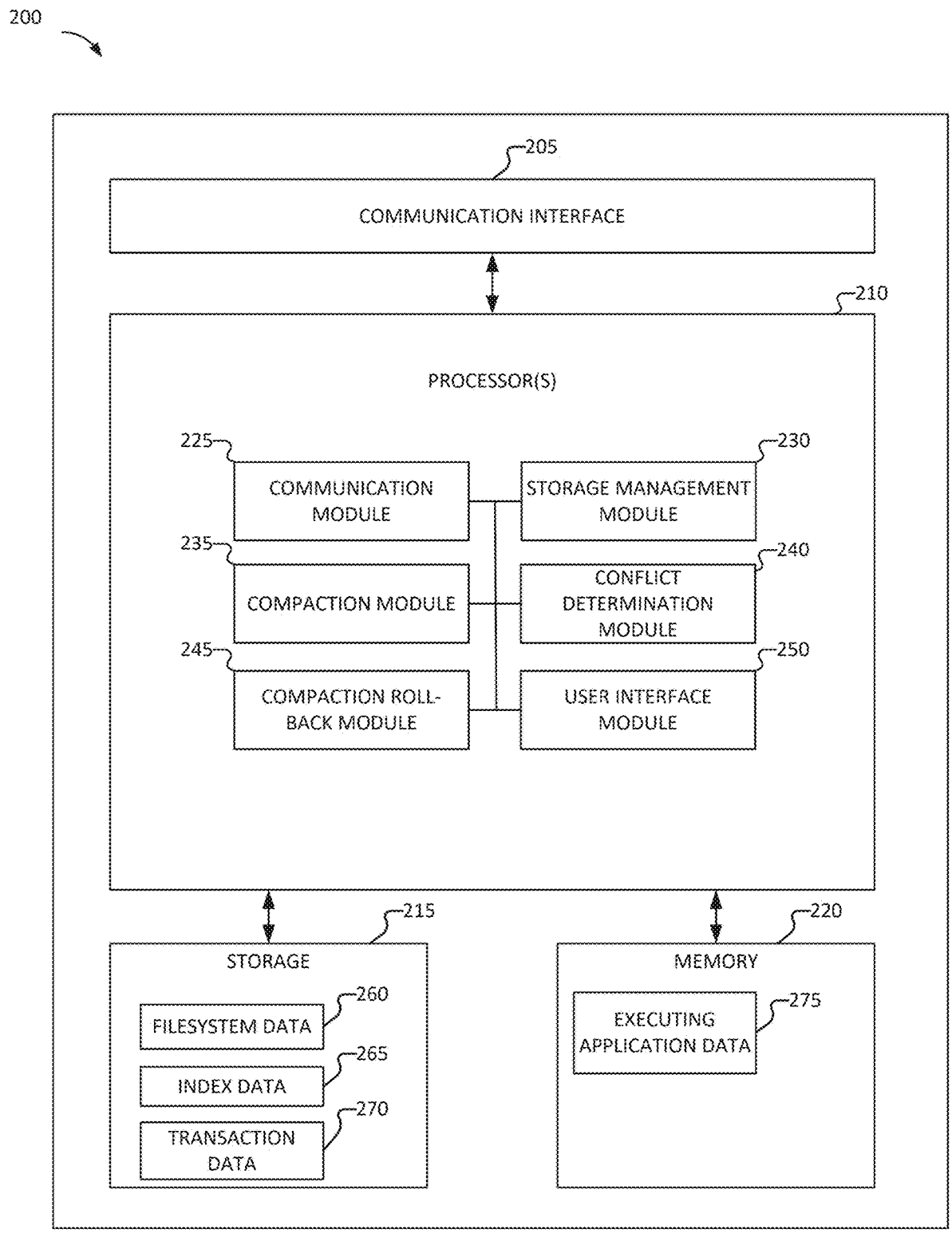
FIG. 2 is a block diagram of a file system service for compacting information according to various embodiments of the present application.

FIG. 2 is a block diagram of a file system service for compacting information according to various embodiments of the present application. In some embodiments, system 200 comprises or corresponds to file system service 110. In some embodiments, system 200 further comprises one or more of database layer 112, control layer 114, and/or business application layer 116. System 200 may implement at least part of process 500 of FIG. 5, process 600 of FIG. 6, process 700 of FIG. 7, and/or process 800 of FIG. 8.

In the example shown, system 200 implements one or more modules in connection with managing one or more features, providing access to the one or more features, and/or tracking (e.g., monitoring) use of the one or more features. System 200 comprises communication interface 205, one or more processors 210, storage 215, and/or memory 220. One or more processors 210 comprises one or more of communication module 225, storage management module 230, compaction module 235, conflict determination module 240, compaction roll-back module 245, and/or user interface module 250.

In some embodiments, system 200 comprises communication module 225. System 200 uses communication module 225 to communicate with various other systems such as an application server, a data store, and/or client terminals or user systems such as a client system or an administrator system. For example, communication module 225 provides to communication interface 205 information that is to be communicated. As another example, communication interface 205 provides to communication module 225 information received by system 200. Communication module 225 is configured to receive one or more queries or requests to execute tasks such as from various client terminals or user systems, a file to store in data storage, an update to (or instruction to update) a feature or a row, a request to perform an operation (e.g., an operation that invokes a business transaction, etc.), a request to set one or more policies, etc. Communication module 225 is configured to provide to various client terminals or user systems information such as information that is responsive to one or more queries or tasks requested to be executed. In some embodiments, communication module 225 provides the information to the various client terminals or user systems information in the form of one or more reports (e.g., according to a predefined format or to a requested format), and/or via one or more users interfaces (e.g., an interface that client system 140 is caused to display). In some embodiments, communication module 225 is configured to receive information and/or an instruction pertaining to whether to perform a compaction or rollback (e.g., a confirmation or authorization to perform a proposed rollback), etc.

In some embodiments, system 200 comprises storage management module 230. System 200 uses storage management module 230 to store and manage files in a dataset such as a dataset stored at data store 120 of system 100. In some embodiments, storage management module 230 stores and/or maintains a log comprising a set of transactions, or a sequence of transactions, performed with respect to a dataset. As an example, the log stores information pertaining to transactions performed (e.g., a type of transaction), the order in which the transactions were performed (e.g., a transaction sequence number, a data/time, etc.), an indication of files or information subject to the transaction, etc. In some embodiments, storage management module 230 comprises an intercept that monitors for operations or transactions being performed with respect to files of a corresponding dataset. In some embodiments, storage management module 230 stores and/or maintains an index of files comprised in a dataset. As an example, the index comprises an indication of a location of a file (e.g., a mapping of files to locations). As another example, the index comprises metadata associated with the files comprised in a dataset. Storage management module 230 is configured to update the index in connection with (e.g., in response to) compaction operations (e.g., re-arranging transactions) and/or rollback transactions. In some embodiments, storage management module 230 updates the index contemporaneous with a compaction or rollback transaction.

In some embodiments, system 200 comprises compaction module 235. System 200 uses compaction module 235 to manage compaction operations performed with respect to one or more datasets. For example, compaction module 235 determines whether to perform one or more compaction operations with respect to a dataset, and performs the corresponding compaction operations. In some embodiments, compaction module 235 determines to perform and/or performs a compaction according to a preset compaction threshold and/or one or more compaction policies. Compaction module 235 performs compaction of a set of files (e.g., a plurality of files) according to one or more conditions such as a re-arrangement transaction to combine a set of files in to a threshold size (e.g., to obtain a compacted file having maximum size such as 1 GB, and/or to obtain a compacted file having a minimum size, etc.). In some embodiments, compaction module 235 performs compaction according to a batch process. For example, compaction module 235 determines to perform a plurality of compactions (e.g., a plurality of re-arrangement transactions) in a batch. As another example, compaction module 235 queues a compaction until a condition for performing a batch of compactions.

In some embodiments, compaction module 235 performs a compaction (e.g., one or more compaction operations such as a re-arrangement transaction, etc.) with respect to one or more files comprised in a dataset. As an example, compaction module 235 automatically performs the compaction in response to a determination that one or more conditions are satisfied (e.g., triggered). Examples of the one or more conditions include: (i) a particular time period has lapsed (e.g., compaction is performed at a predetermined frequency) since a last compaction, (ii) a dataset or a set of files comprised in the dataset satisfy one or more preset conditions (e.g., a density of files, a number of files, a threshold number or percentage of files being smaller than a threshold size, etc.), and (iii) a threshold number of compaction operations are queued. Various other conditions (or combinations thereof) may be implemented. In some embodiments, the one or more conditions (or at least a subset thereof) are defined in one or more compaction policies.

In some embodiments, system 200 comprises conflict determination module 240. System 200 uses conflict determination module 240 to determine whether a conflict exists between two transactions (e.g., a business transaction and a compaction or other re-arrangement OR a business transaction and another business transaction). Conflict determination module 240 receives an indication that a transaction is attempting to impact (e.g., access, delete, modify, etc.) a file, such as a file stored in a dataset. Conflict determination module 240 determines whether the file impacted by the transaction was impacted by a compaction (e.g., an intervening re-arrangement operation). For example, conflict determination module 240 determines whether the file subject to the business transaction has been impacted by another transaction or compaction or other re-arrangement. In some embodiments, in response to receiving a business transaction, conflict determination module 240 performs a lookup with respect to the log to determine whether the information associated with the business transaction is subject to an intervening transaction since the business transaction was received. For example, conflict determination module 240 uses the log in connection with determining whether a conflict exists with respect to the business transaction.

In some embodiments, system 200 comprises conflict determination module 240. System 200 uses conflict determination module 240 to determine whether to perform a rollback of the compaction or other re-arrangement and to perform a rollback of the compaction or other re-arrangement in response to determining to perform the rollback.

In response to determining that information impacted by the business transaction (e.g., one or more files) matches (e.g., is the same as, conflicts with, etc.) information impacted by an intervening compaction or other re-arrangement, conflict determination module 240 determines whether to rollback the compaction or other re-arrangement. In some embodiments, conflict determination module 240 determines whether to rollback the compaction or other re-arrangement based at least in part on one or more conflict policies (or rollback policies). Examples of the one or more conflict policies include one or more of: (i) rolling back the compaction or other re-arrangement by default in response to detecting a conflict between a business transaction and an intervening compaction or other re-arrangement, (ii) rolling back the compaction or other re-arrangement provided that an extent of a change in the state of the dataset does not exceed a predetermined rollback threshold, (iii) allowing a business transaction to fail in response to a determination that the extent of a change in the state of the dataset exceeds (or is equal to) a predetermined rollback threshold, (iv) prompting a user to confirm or authorize a proposed compaction or other re-arrangement that is determined in response to detection of the conflict between a business transaction and an intervening compaction or other re-arrangement, (v) using the relative priorities corresponding to the business transaction and the compaction or other re-arrangement, and using a higher priority to determine which transaction to commit, (vi) a threshold number (or percentage) of files that were subject to compaction or other re-arrangement are deemed to be impacted by the one or more business transactions and thus subject to rollback, etc. Various other policies or conditions may be implemented in connection with the one or more conflict policies.

According to various embodiments, conflict determination module 240 determines an extent to which to rollback a compaction or other re-arrangement. For example, in response to a determination that a compaction is to be rolled back, conflict determination module 240 then determines an extent to which the compaction or other re-arrangement is to be rolled back, such as using a partial rollback, or a full rollback, etc. In some embodiments, conflict determination module 240 uses the one or more conflict policies. In some embodiments, conflict determination module 240 determines to perform a plurality of rollback transactions, including a first subset of the rollback transactions that correspond to full rollback transactions, and a second subset of the rollback transactions that correspond to partial rollback transactions. A partial rollback is beneficial because the system does not lose its progress (e.g., efficiencies obtained by compaction) with respect to all the other files that are not impacted by the business transaction or rollback transaction. In some embodiments, conflict determination module 240 determines an extent to which to roll back the compaction or other re-arrangement based at least in part on the information (e.g., the set of one or more files) that are impacted by the business transaction(s) and/or information deemed to be in conflict between the business transaction(s) and the compaction(s). As an example, conflict determination module 240 uses the log in connection with determining an extent of the rollback. Conflict determination module 240 uses the log to determine the set of files impacted by both the business transaction(s) and the compaction(s). In some embodiments, conflict determination module 240 uses the log to determine a set of transactions and/or files that are in conflict if a compaction or other re-arrangement is to be rolled back (e.g., if an intervening transaction has re-written a file or uses a file name of a file that was subject to compaction or other re-arrangement).

In some embodiments, system 200 comprises user interface module 250. System 200 uses user interface module provides a user interface via which a user discovers and/or accesses one or more files stored in a dataset, to set one or more conflict policies or compaction or other re-arrangement policies (e.g., a compaction threshold, etc.), and/or to confirm or authorize a proposed rollback (or proposed denial of rollback), etc. As an example, the web interface is provided as a web service such as on a page accessed by a user.

In some embodiments, system 200 uses user interface module 250 to configure and provide a prompt to a user in connection with confirming or authorizing rollback of a compaction or other re-arrangement transaction. System 200 may determine that certain information is impacted by a business transaction and that such information is subject to an intervening re-arrangement transaction(s) (e.g., a compaction operation). In response to determining that a rollback is to be performed in order to commit the business transaction, user interface module 250 prompts the user to confirm or authorize the rollback of the intervening re-arrangement transaction(s). For example, user interface module 250 causes a client terminal to display a prompt alerting the user that a business transaction impacts information that has been subject to an intervening re-arrangement transaction, and providing selectable elements via which the user can select whether to accept or decline the rollback transaction.

According to various embodiments, storage 215 comprises one or more of filesystem data 260, index data 265, and/or transaction data 270. Storage 215 comprises a shared storage (e.g., a network storage system) and/or database data, and/or user activity data. In some embodiments, filesystem data 260 comprises a database such as one or more datasets (e.g., one or more datasets for one or more files, etc.). Filesystem data 260 comprises data such as data generated in connection with managing files in a dataset, one or more policies or thresholds, historical information pertaining to compactions and/or rollbacks, etc. In some embodiments, index data 265 comprises information pertaining to locations of files stored in a dataset and/or metadata pertaining to the files. For example, index data 265 comprises a mapping of files to storage locations. In some embodiments, transaction data 270 comprises information pertaining to one or more transactions such as committed transactions and/or active transactions (e.g., transactions that are not yet complete). The information pertaining to the transaction includes a type of transaction, a set of one or more operations to be performed with respect to a file, an indication of one or more files impacted by the operation, etc.

According to various embodiments, memory 220 comprises executing application data 275. Executing application data 275 comprises data obtained or used in connection with executing an application such as an application executing in connection with managing files stored on a dataset, and/or managing a compaction process, a rollback process, etc., In embodiments, the application comprises one or more applications that perform one or more of receive and/or execute a query or task, generate a report and/or configure information that is responsive to an executed query or task, and/or to provide to a user information that is responsive to a query or task. Other applications comprise any other appropriate applications (e.g., an index maintenance application, a communications application, a chat application, a web browser application, a document preparation application, a report preparation application, a user interface application, a data analysis application, an anomaly detection application, a user authentication application, a security policy enforcement application, a feature rating application, a feature analysis application, a feature development application, etc.).

Figure 3A:
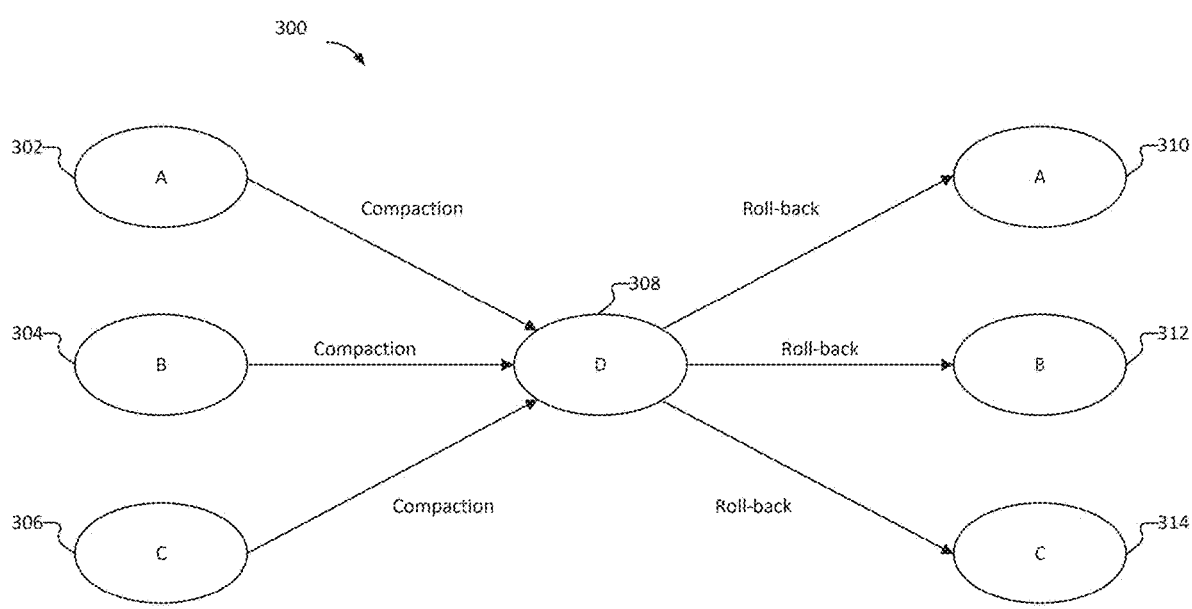
FIG. 3A is a state diagram of a compaction of information and rollback of a transaction according to various embodiments of the present application.

FIG. 3A is a state diagram of a compaction of information and rollback of a transaction according to various embodiments of the present application. As illustrated in FIG. 3A, a compaction is performed with respect to a set of objects (e.g., files) to obtain a compacted object (e.g., a file output or resulting from the compaction). In response to determining to perform a rollback of the compaction such as to revert the dataset to an original state, the compaction is rolled back (e.g., voided) at least with respect to a particular object that was input to the compaction operation. According to state diagram 300, object A 302, object B 304, and object 306 are compacted to obtain object D 308. In response to a determination to rollback the compaction, the rollback of the compaction results in object A 310, object B 312, and object C 314 being reconstituted (e.g., the index is updated to include mapping of files to locations to include information for object A, object B, and object C). State diagram 300 illustrates a full rollback. In some embodiments, the full rollback is performed only if such a rollback is determined to not fail. For example, the system determines whether an intervening business transaction (e.g., a write operation) is performed with respect to a file included in the compaction after the compaction.

Figure 3B:
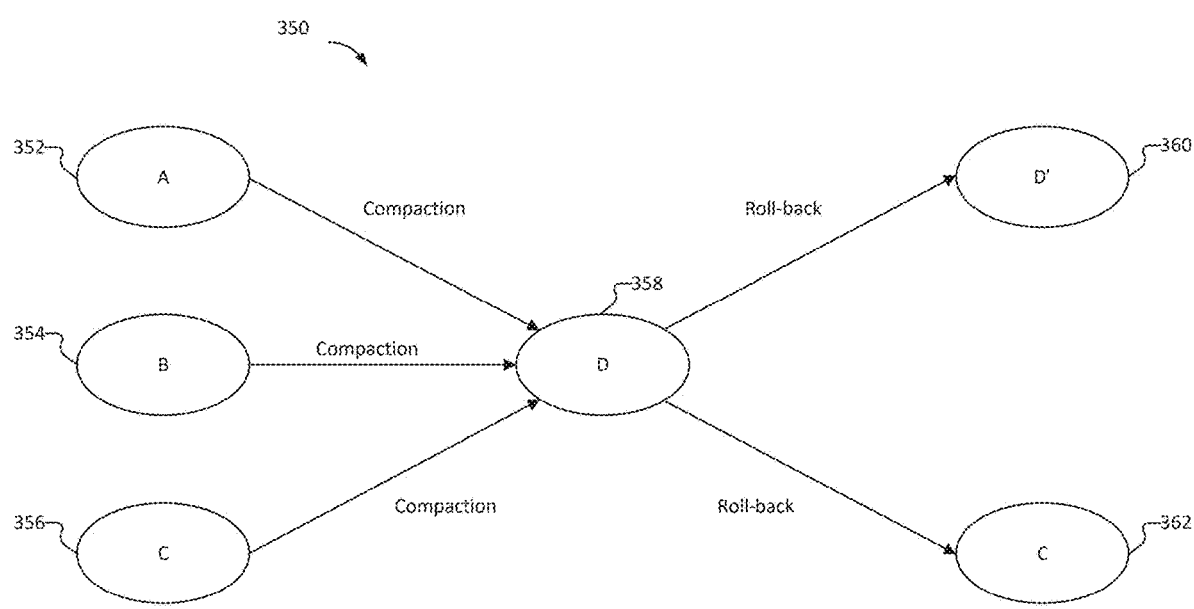
FIG. 3B is a state diagram of a compaction of information and rollback of a transaction according to various embodiments of the present application.

FIG. 3B is a state diagram of a compaction of information and rollback of a transaction according to various embodiments of the present application. As illustrated in FIG. 3B, a compaction is performed with respect to a set of objects (e.g., files) to obtain a compacted object (e.g., a file output or resulting from the compaction). In response to determining to perform a rollback of the compaction with respect to a particular object, the compaction is rolled back (e.g., voided) at least with respect to a particular object that was input to the compaction operation. According to state diagram 350, object A 352, object B 354, and object C 356 are compacted to obtain object D 358. In response to a determination that a business transaction conflicts with the compaction with respect to object C 356, the system determines to roll back the compaction at least with respect to object C 356. The rollback of the compaction results in object D' 360 and object C 362 being reconstituted. The index is updated to include mapping of files to locations to include information for object D' 360 and object C 362). State diagram 350 illustrates a partial rollback. For example, object D' 360 corresponds to a compacted file comprising the information for object A 352 and object B 354 (e.g., object A 352 and object B 354 remain compacted). In some embodiments, if the system determines to perform a rollback, then a partial rollback may be required if an intervening request would cause a full rollback to fail.

Figure 4A:
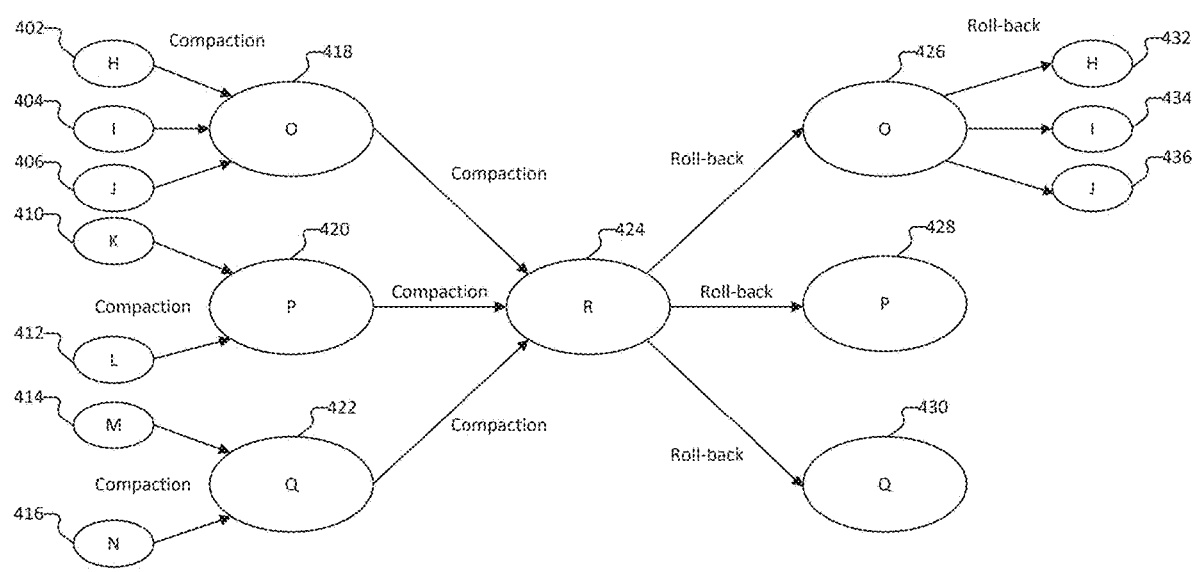
FIG. 4A is a state diagram of a compaction of information and rollback of a transaction according to various embodiments of the present application.

FIG. 4A is a state diagram of a compaction of information and rollback of a transaction according to various embodiments of the present application. As illustrated in FIG. 4A, a plurality of compactions are performed with respect to a set of objects (e.g., files) to obtain a plurality compacted objects (e.g., a file output or resulting from the compaction), and a further compaction is performed with respect to the plurality of compacted objects to obtain a resulting object. In response to determining to perform a rollback of the plurality of compactions such as to revert the dataset to an original state, the compaction is rolled back (e.g., voided) at least with respect to a particular object that was input to the plurality of compaction operations.

According to state diagram 400, object H 402, object I 404, and object J 406 are compacted to obtain object O 418;

object K 410 and object L 412 are compacted to obtain object P 420; and object M 414 and object N 416 are compacted to obtain object Q 422. In response to a determination that a further compaction is to be performed, object O 418, object P 420, and object Q 422 are compacted to obtain object R 424. As an example, in response to a determination that a business transaction (e.g., an active transaction as of a time before the first compaction operations to obtain object (418) conflicts with the compaction with respect to object I 434, the system determines whether to roll back the compactions of any of object R 424, object O 418, object P 420, and/or object Q 422. In response to a determination to perform a rollback(s), the system determines the extent of the rollback(s). For example, the system determines whether to perform a partial or full rollback of object R 424, and/or subsequently a partial or full rollback of any of object O 418, object P 420, and/or object Q 422. In the state diagram 400, a full rollback of object R 424 is performed to obtain object O 426, object P 428, and object Q 430, and the system then performs a full rollback of object O 426 to obtain object H 432, object I 434, and object J 436. The system may then commit the business transaction with respect to object I 434. Object P 428 and object Q 430 may be maintained as compacted objects. In some implementations, object P 428 and object Q 430 may be subject to further compaction (e.g., may be further compacted with each other and/or one or more other objects).

Figure 4B:
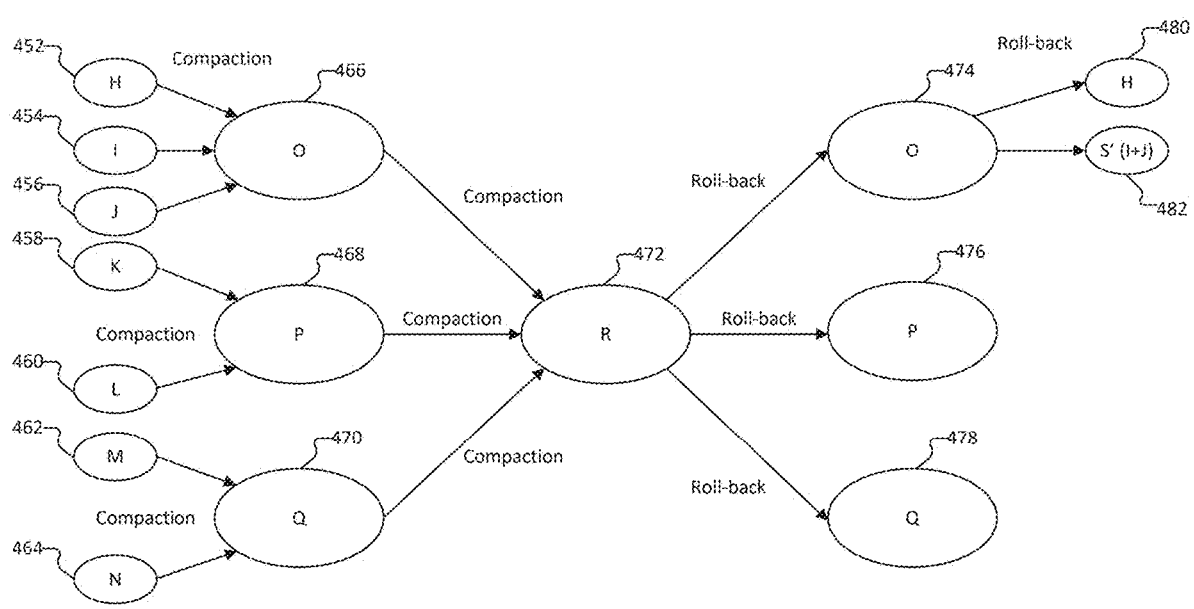
FIG. 4B is a state diagram of a compaction of information and rollback of a transaction according to various embodiments of the present application.

FIG. 4B is a state diagram of a compaction of information and rollback of a transaction according to various embodiments of the present application. As illustrated in FIG. 4B, a plurality of compactions are performed with respect to a set of objects (e.g., files) to obtain a plurality compacted objects (e.g., a file output or resulting from the compaction), and a further compaction is performed with respect to the plurality of compacted objects to obtain a resulting object. In response to determining to perform a rollback of the plurality of compactions such as to revert the dataset to an original state, the compaction is rolled back (e.g., voided) at least with respect to a particular object that was input to the plurality of compaction operations.

According to state diagram 450, object H 452, object I 454, and object J 456 are compacted to obtain object O 466; object K 458 and object L 460 are compacted to obtain object P 468; and object M 462 and object N 464 are compacted to obtain object Q 470. In response to a determination that a further compaction is to be performed, object O 466, object P 468, and object Q 470 are compacted to obtain object R 472. As an example, in response to a determination that a business transaction (e.g., an active transaction as of a time before the first compaction operations to obtain object (466) conflicts with the compaction with respect to object H 480, the system determines whether to roll back the compactions of any of object R 472, object O 466, object P 468, and/or object Q 476. In response to a determination to perform a rollback(s), the system determines the extent of the rollbacks. For example, the system determines whether to perform a partial or full rollback of object R 472, and/or subsequently a partial or full rollback of any of object O 466, object P 468, and/or object Q 470. In the state diagram 450, a full rollback of object R 472 is performed to obtain object O 474, object P 476, and object Q 478, and the system then performs a partial rollback of object O 474 to obtain object H 480, object S' 482 (e.g., object S' 482 corresponds to object I 454 and object J 456 after compaction). For example, object S' 482 is the remainder of the partial rollback of object O 474 in order to obtain object H 480. The system may then commit the business transaction with respect to object H 480. Object P 476 and object Q 478 may be maintained as compacted objects. In some implementations, object P 476 and object Q 478 may be subject to further compaction (e.g., may be further compacted with each other and/or one or more other objects).

Figure 4C:
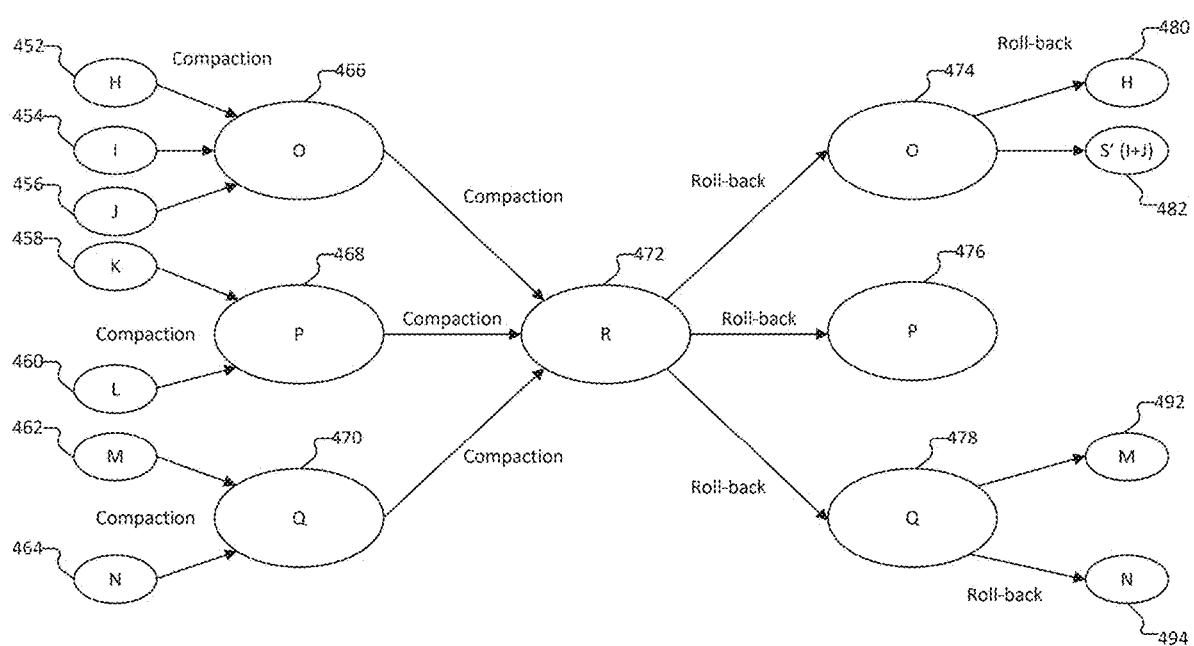
FIG. 4C is a state diagram of a compaction of information and rollback of a transaction according to various embodiments of the present application.

FIG. 4C is a state diagram of a compaction of information and rollback of a transaction according to various embodiments of the present application. As illustrated in FIG. 4C, a plurality of compactions are performed with respect to a set of objects (e.g., files) to obtain a plurality compacted objects (e.g., a file output or resulting from the compaction), and a further compaction is performed with respect to the plurality of compacted objects to obtain a resulting object. In response to determining to perform a rollback of the plurality of compactions such as to revert the dataset to an original state, the compaction is rolled back (e.g., voided) at least with respect to a particular object that was input to the plurality of compaction operations.

According to state diagram 490, object H 452, object I 454, and object J 456 are compacted to obtain object O 466; object K 458 and object L 460 are compacted to obtain object P 468; and object M 462 and object N 464 are compacted to obtain object Q 470. In response to a determination that a further compaction is to be performed, object O 466, object P 468, and object Q 470 are compacted to obtain object R 472. As an example, in response to a determination that a business transaction (e.g., an active transaction as of a time before the first compaction operations to obtain object O 466 and object Q 470) conflicts with the compaction with respect to object H 452, object M 462, and object N 464 (e.g., the business transaction attempts to modify/delete each of object H 452, object M 462, and object N 464), the system determines whether to roll back the compactions of any of object R 472, object O 466, object P 468, and/or object Q 470. In response to a determination to perform a rollback(s), the system determines the extent of the rollbacks. For example, the system determines whether to perform a partial or full rollback of object R 472, and/or subsequently a partial or full rollback of any of object O 466, object P 468, and/or object Q 476. In the state diagram 490, a full rollback of object R 472 is performed to obtain object O 474, object P 476, and object Q 478, and the system then performs a partial rollback of object O 474 to obtain object H 480, object S' 482 (e.g., object S' 482 corresponds to object I 454 and object J 456 after compaction); and the system performs a full rollback of object Q 478 to obtain object M 492 and object N 494. As an example, object S' 482 is the remainder of the partial rollback of object O 474 in order to obtain object H 480. The system may then commit the business transaction with respect to object H 480. Object P 476 and object Q 478 may be maintained as compacted objects. In some implementations, object P 476 may be subject to further compaction (e.g., may be further compacted with each other and/or one or more other objects).

Figure 5:
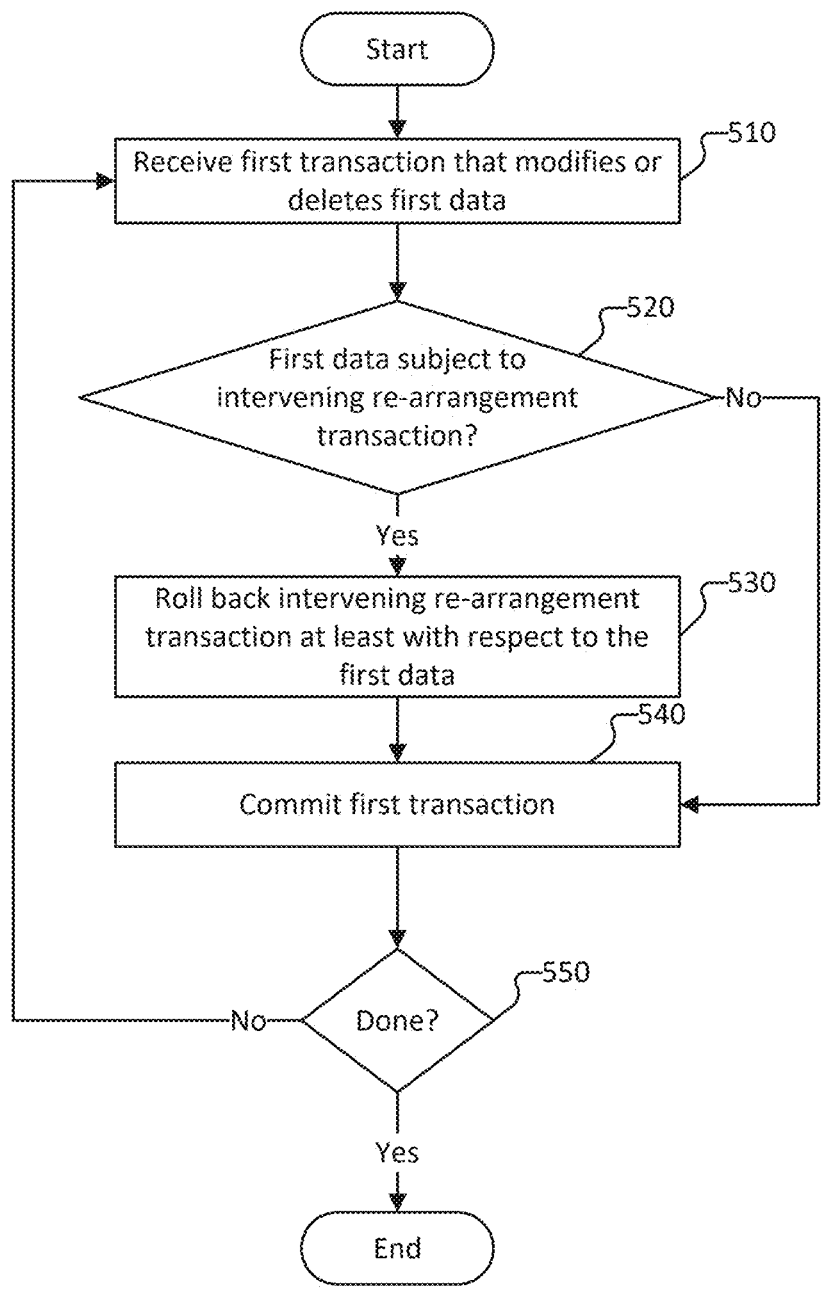
FIG. 5 is a flow diagram of a method for rolling back a transaction according to various embodiments of the present application.

FIG. 5 is a flow diagram of a method for rolling back a transaction according to various embodiments of the present application. In some embodiments, process 500 is implemented at least in part by system 100 of FIG. 1 (e.g., file system service 110), and/or system 200 of FIG. 2. In some embodiments, process 500 is implemented in connection with process 600 of FIG. 6, process 700 of FIG. 7, and/or process 800 of FIG. 8.

At 510, a first transaction that modifies or deletes first data is received. In some embodiments, the first transaction is invoked in connection with an active transaction (e.g., a request or task that was received at an earlier time). The first transaction may be a business transaction that attempts to access the first data. In some embodiments, the first data corresponds to one or more files. As an example, the one or more files are located in a same dataset. As another example, the first data corresponds to a plurality of files that are respectively located in different datasets. In some embodiments, in response to receiving the first transaction, the system determines the first data. For example, the system receives the first transaction and determines data that is to be impacted by the first transaction.

At 520, a determination is made as to whether the first data is subject to an intervening re-arrangement transaction. In some embodiments, in response to determining that the first transaction impacts the first data, the system determines whether an intervening re-arrangement transaction was invoked since the earlier time when the active transaction was received (e.g., the transaction from which the first transaction was invoked).

According to various embodiments, the system determines whether the first data is subject to an intervening re-arrangement transaction based at least in part on the log. The system stores a log or set of one or more other files stored in a dataset table comprising a set of transactions, or a sequence of transactions, performed with respect to a dataset. The log stores an indication of a set of files involved in a corresponding transaction (e.g., a compaction, a business transaction, etc.). For example, the log stores a mapping of the information subject to the compaction. For example, a file number or transaction number may be used in connection with determining an order in which transactions are performed. In some embodiments, the system uses the log to reconstruct/revert a dataset to an earlier date/time. For example, the system uses the log to determine a set of transactions to reverse in connection with configuring the dataset to a state corresponding to such earlier date/time. An example of a context according to which the system determines to reverse a set of transaction (e.g., to revert a state of at least part of the dataset to an earlier date/time) is in connection with conflicting business transactions and compaction operations (e.g., an intervening re-arrangement transaction).

In some embodiments, the system determines whether an intervening re-arrangement transaction exists based at least in part on using the first data (e.g., an identifier associated with the first data such as file names, file locations, file hashes, etc.) to query the log. The system determines based on the result of the query of the log whether the first data was subject to any transactions such earlier time that the active transaction was received. The system may also determine whether any transactions that impacted the first data since such earlier time was an intervening re-arrangement transaction (e.g., a compaction).

In response to determining that the first data is subject to an intervening re-arrangement transaction at 520, process 500 proceeds to 530 at which the intervening re-arrangement transaction is rolled back at least with respect to the first data. In some embodiments, the first transaction is committed (e.g., with respect to the first data) after the intervening re-arrangement transaction is rolled back at least with respect to the first data. In some embodiments, the first transaction is combined with the rollback operation and committed as a single transaction. In some embodiments, one or more rollbacks may occur in series or parallel as part of an operation.

According to various embodiments, in connection with rolling back the intervening re-arrangement transaction, the system determines an extent of the rollback operation. For example, the system determines whether to perform a partial rollback (e.g., a rollback of a partial set of data that was compacted) or a full rollback. The extent to which the compaction is rolled back may be determined based at least in part on the information subject to the conflict (e.g., the information impacted by the business transaction, the information of the compaction giving rise to the conflict, etc.), which in this example is the first data. For example, the system determines an extent of the first data relative to the data subject to the intervening re-arrangement transaction. In some embodiments, the system determines whether to perform a partial rollback or a full rollback based on whether an extent of the first data relative to the data subject to the intervening re-arrangement transaction exceeds a predefined threshold. In some embodiments, the system determines whether to perform a partial rollback or a full rollback based at least in part on a user input (e.g., a user selects between the partial rollback or full rollback in connection with being prompted in response to a determination that a rollback is to be performed/proposed, etc.).

In some embodiments, the system determines whether to perform a partial rollback or a full rollback based at least in part on one or more conflict policies (or rollback policies). In some embodiments, an administrator selects policies with defaults set by a system implementor. Examples of the one or more conflict policies include one or more of: (i) rolling back the compaction by default in response to detecting a conflict between a business transaction and an intervening compaction, (ii) rolling back the compaction provided that an extent of a change in the state of the dataset does not exceed a predetermined rollback threshold, (iii) allowing a business transaction to fail in response to a determination that the extent of a change in the state of the dataset exceeds (or is equal to) a predetermined rollback threshold, (iv) prompting a user to confirm or authorize a proposed compaction that is determined in response to detection of the conflict between a business transaction and an intervening compaction, (v) using the relative priorities corresponding to the business transaction and the compaction, and using a higher priority to determine which transaction to commit, (vi) a threshold number (or percentage) of files that were subject to compaction are deemed to be impacted by the one or more business transactions and thus subject to rollback, etc. Various other policies or conditions may be implemented in connection with the one or more conflict policies.

In response to determining that the first data is not subject to an intervening re-arrangement transaction at 520, process 500 proceeds to 540 at which the first transaction is committed.

At 550, a determination is made as to whether process 500 is complete. In some embodiments, process 500 is determined to be complete in response to a determination that no further compaction operations (e.g., intervening re-arranging transactions) are performed for which a rollback assessment is to be performed, no further transactions exist, a user has indicated that no further transactions are to be committed with respect to a dataset, no further records (e.g., files) are to be compacted, the user has exited the system, an administrator indicates that process 500 is to be paused or stopped, etc. In some embodiments, process 500 include multiple rollbacks that are performed before committing the first transaction in 540. In response to a determination that process 500 is complete, process 500 ends. In response to a determination that process 500 is not complete, process 500 returns to 510.

Figure 6:
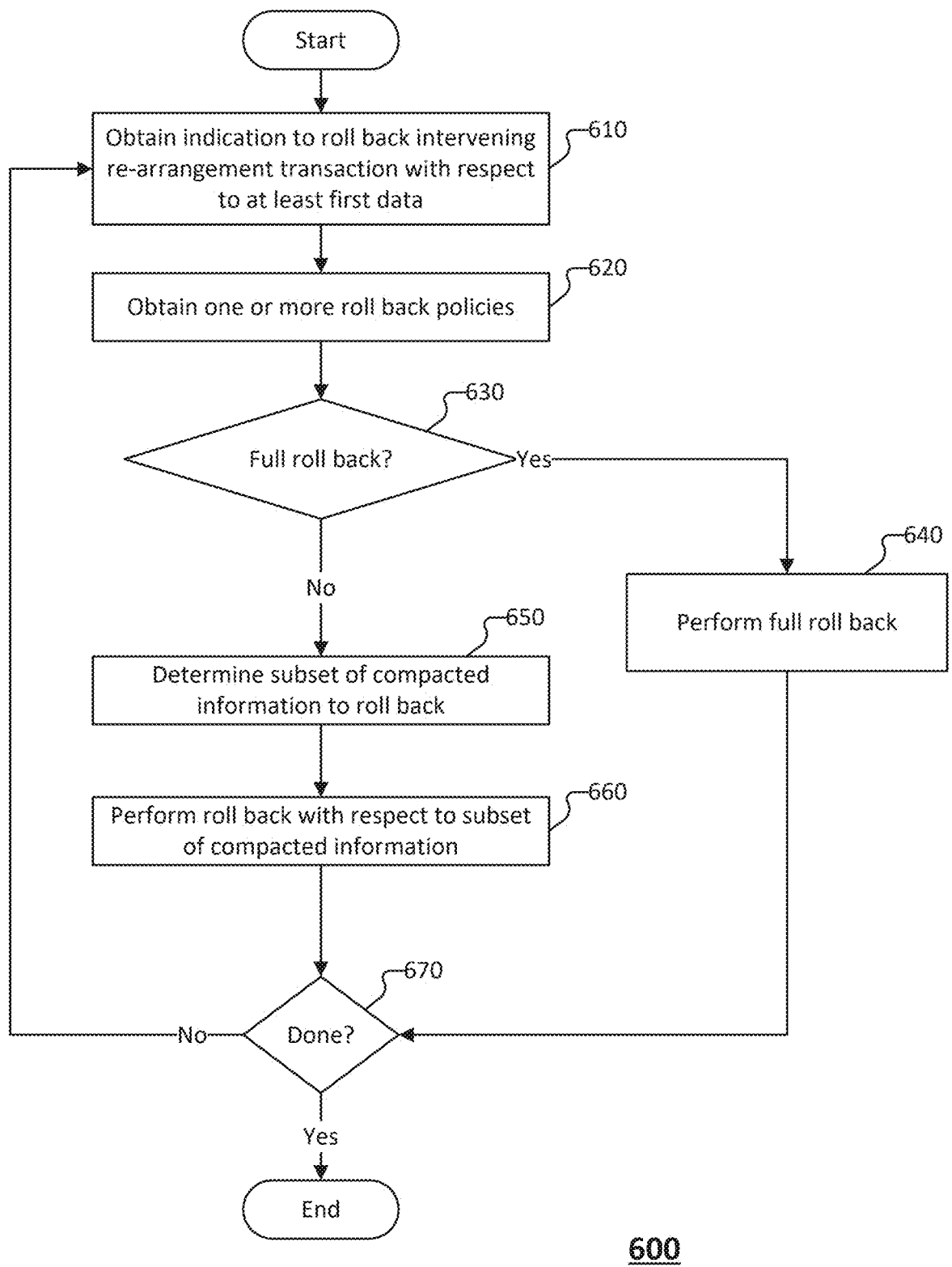
FIG. 6 is a flow diagram of a method for rolling back a transaction according to various embodiments of the present application.

FIG. 6 is a flow diagram of a method for rolling back a transaction according to various embodiments of the present application. In some embodiments, process 600 is implemented at least in part by system 100 of FIG. 1 (e.g., file system service 110), and/or system 200 of FIG. 2. In some embodiments, process 600 is implemented in connection with process 500 of FIG. 5, process 700 of FIG. 7, and/or process 800 of FIG. 8.

According to various embodiments, process 600 is invoked in connection with 530 of process 500 of FIG. 5.

At 610, an indication to roll-back an intervening re-arrangement transaction with respect to at least first data is obtained. In some embodiments, the system determines to roll back an intervening re-arrangement transaction and the indication to roll back the intervening re-arrangement transaction with respect to at least first data is invoked.

At 620, one or more rollback policies are obtained. In some embodiments, the system determines one or more rollback policies pertaining to the data impacted by the roll-back such as a policy for associated with a dataset, a customer corresponding to the dataset, etc.

Examples of the one or more rollback policies include one or more of: (i) rolling back the compaction by default in response to detecting a conflict between a business transaction and an intervening compaction, (ii) rolling back the compaction provided that an extent of a change in the state of the dataset does not exceed a predetermined rollback threshold, (iii) allowing a business transaction to fail in response to a determination that the extent of a change in the state of the dataset exceeds (or is equal to) a predetermined rollback threshold, (iv) prompting a user to confirm or authorize a proposed compaction that is determined in response to detection of the conflict between a business transaction and an intervening compaction, (v) using the relative priorities corresponding to the business transaction and the compaction, and using a higher priority to determine which transaction to commit, (vi) a threshold number (or percentage) of files that were subject to compaction are deemed to be impacted by the one or more business transactions (e.g., and thus subject to rollback), etc. Various other policies or conditions may be implemented in connection with the one or more rollback policies. In various embodiments, the one or more policies comprises: a) priority of the business transaction, where a critical business transaction always causes a rollback to happen, while an unimportant business transaction does not; b) whether the business transaction can be retried safely; c) some business transactions are not safe to reapply because of various reasons, such as the fact that the business logic makes changes to external systems that should not be executed repeatedly; d) cost of the business transaction, where a low-cost business transaction is allowed to fail, but an expensive business transaction (e.g. a transaction that took hours to complete) is not allowed to fail, so in that case a rollback is performed; e) cost of the re-arrangement transaction—some re-arrangements are expensive too; or any other appropriate policy. In some embodiments, the policy could be based on comparing the cost of the business transaction with the cost of the rearrangement transaction, and choosing to roll back if the business transaction is more expensive, while choosing to not roll back if the re-arrangement transaction is more expensive.

At 630, a determination is made as to whether to perform a full rollback. In some embodiments, the system determines whether to perform a full rollback of the intervening re-arrangement transaction based at least in part on the one or more rollback policies. In some embodiments, in response to a determination not perform a full rollback, it is determined whether to perform a partial rollback.

As an example, in response to determining that a number (or percentage) of files that were subject to compaction are deemed to be impacted by the business transaction that equals to or exceeds a threshold number (or percentage) of files, the system determines to perform a full rollback. As another example, in response to determining that a number (or percentage) of files that were subject to compaction are deemed to be impacted by the business transaction that is less than a threshold number (or percentage) of files, the system determines to perform a partial rollback.

As another example, the system determines whether a rollback will fail based on a conflict that would be caused by the rollback (e.g., if a compacted file has been re-written since the compaction). In some embodiments, if the system determines that a full rollback would fail, then the system determines to perform a partial rollback (e.g., if such partial rollback would be sufficient for resolving the conflict between the business transaction and the compaction).

As another example, in response to determining that an extent of a change in the state of the dataset if a compaction were to be compacted does not exceed a predetermined rollback threshold, then the system determines to perform a full rollback; and in in response to determining that an extent of a change in the state of the dataset if a compaction were to be compacted equals or exceeds a predetermined rollback threshold, then the system determines to perform a partial rollback.

In response to determining to perform the full rollback at 630, process 600 proceeds to 640 at which the full rollback is performed. In some embodiments, the system rolls back an entirety of the intervening re-arrangement transaction. For example, the system updates the index to reflect a state with respect to the information impacted by the intervening re-arrangement transaction (e.g., the compacted information) before the intervening re-arrangement transaction was performed. In some embodiments, the index is updated to comprise the appropriate mapping of files to locations at which the files are stored (e.g., the index is updated to include a remove the record for the compacted file, and to add one or more records for a mapping of files and locations of such files, including at least one file corresponding to the first data).

In response to determining to not perform the full rollback at 630, process 600 proceeds to 650 at which a subset of compacted information to be rolled back is determined.

At 660, a rollback is performed with respect to the subset of compacted information. In some embodiments, the system voids the compaction at least with respect to the data impacted by the compaction and the business transaction (e.g., the first data for which a conflict exists). The rolling back the compaction comprises updating an index to comprise a record for the first data, which includes an indication of a location at which the first data is located.

At 670, a determination is made as to whether process 600 is complete. In some embodiments, process 600 is determined to be complete in response to a determination that no further compaction operations (e.g., re-arranging transactions) are performed for which a rollback assessment is to be performed, no further transactions that include accessing data exists, a user has indicated that no further transactions are to be committed with respect to a dataset, no further records (e.g., files) are to be compacted, the user has exited the system, an administrator indicates that process 600 is to be paused or stopped, etc. In response to a determination that process 600 is complete, process 600 ends. In response to a determination that process 600 is not complete, process 600 returns to 610.

Figure 7:
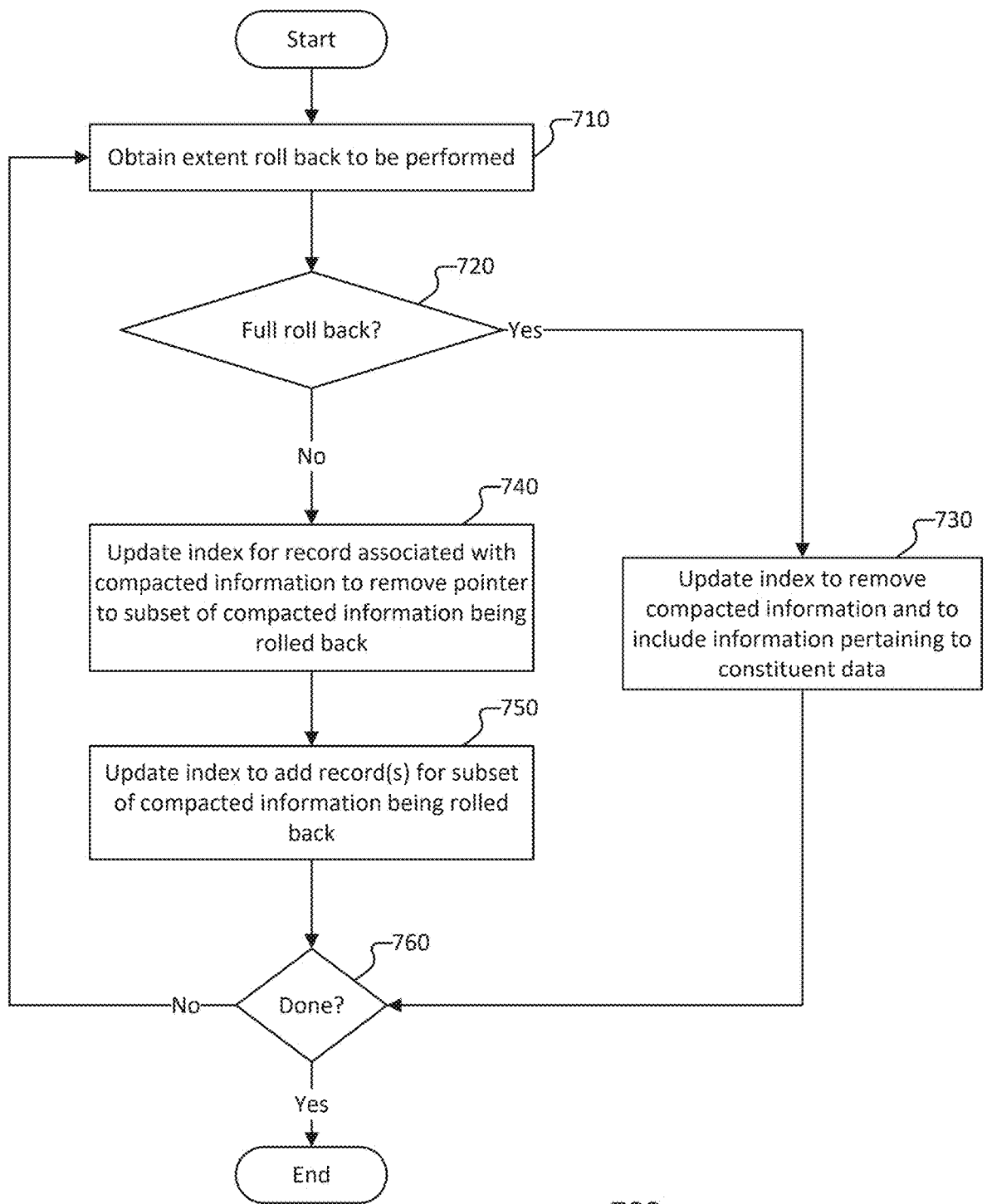
FIG. 7 is a flow diagram of a method for updating an index based on a rollback of a transaction according to various embodiments of the present application.

FIG. 7 is a flow diagram of a method for updating an index based on a rollback of a transaction according to various embodiments of the present application. In some embodiments, process 700 is implemented at least in part by system 100 of FIG. 1 (e.g., file system service 110), and/or system 200 of FIG. 2. In some embodiments, process 700 is implemented in connection with process 500 of FIG. 5, and/or process 800 of FIG. 8.

According to various embodiments, process 700 is invoked in connection with 530 of process 500 of FIG. 5.

At 710, an extent of a roll-back to be performed is obtained. In some embodiments, the system determines the extent of a rollback based at least in part on one or more rollback policies.

At 720, a determination is made as to whether a full rollback is to be performed. The determination of whether the full rollback is to be performed is based at least in part on the obtained extent of a roll-back to be performed.

In response to a determination that a full roll-back is to be performed at 720, process 700 proceeds to 730 at which an index is updated to remove compacted information and to include information pertaining to constituent data. In some embodiments, the updating the index includes rendering the index as it was before the compaction (e.g., at least with respect to the constituent data). For example, the index is updated to include records corresponding to the constituent data of the compaction, and a mapping of locations is comprised in the index for such constituent data.

In response to a determination that a full roll-back is not to be performed at 720, process 700 proceeds to 740 at which the index is updated for a record(s) associated with compacted information to remove a pointer to a subset of compacted information being rolled-back.

At 750, the index is updated to add record(s) for the subset of compacted information being rolled-back. In some embodiments, the updating the index includes rendering the part of the index pertaining to the information associated with the subset of compacted information being rolled-back as it was before the compaction.

At 760, a determination is made as to whether process 700 is complete. In some embodiments, process 700 is determined to be complete in response to a determination that no further compaction operations (e.g., re-arranging transactions) are performed for which a rollback assessment is to be made, no further transactions that include accessing data exists, a user has indicated that no further transactions are to be committed with respect to a dataset, no further records (e.g., files) are to be compacted, the user has exited the system, an administrator indicates that process 700 is to be paused or stopped, etc. In response to a determination that process 700 is complete, process 700 ends. In response to a determination that process 700 is not complete, process 700 returns to 710.

Figure 8:
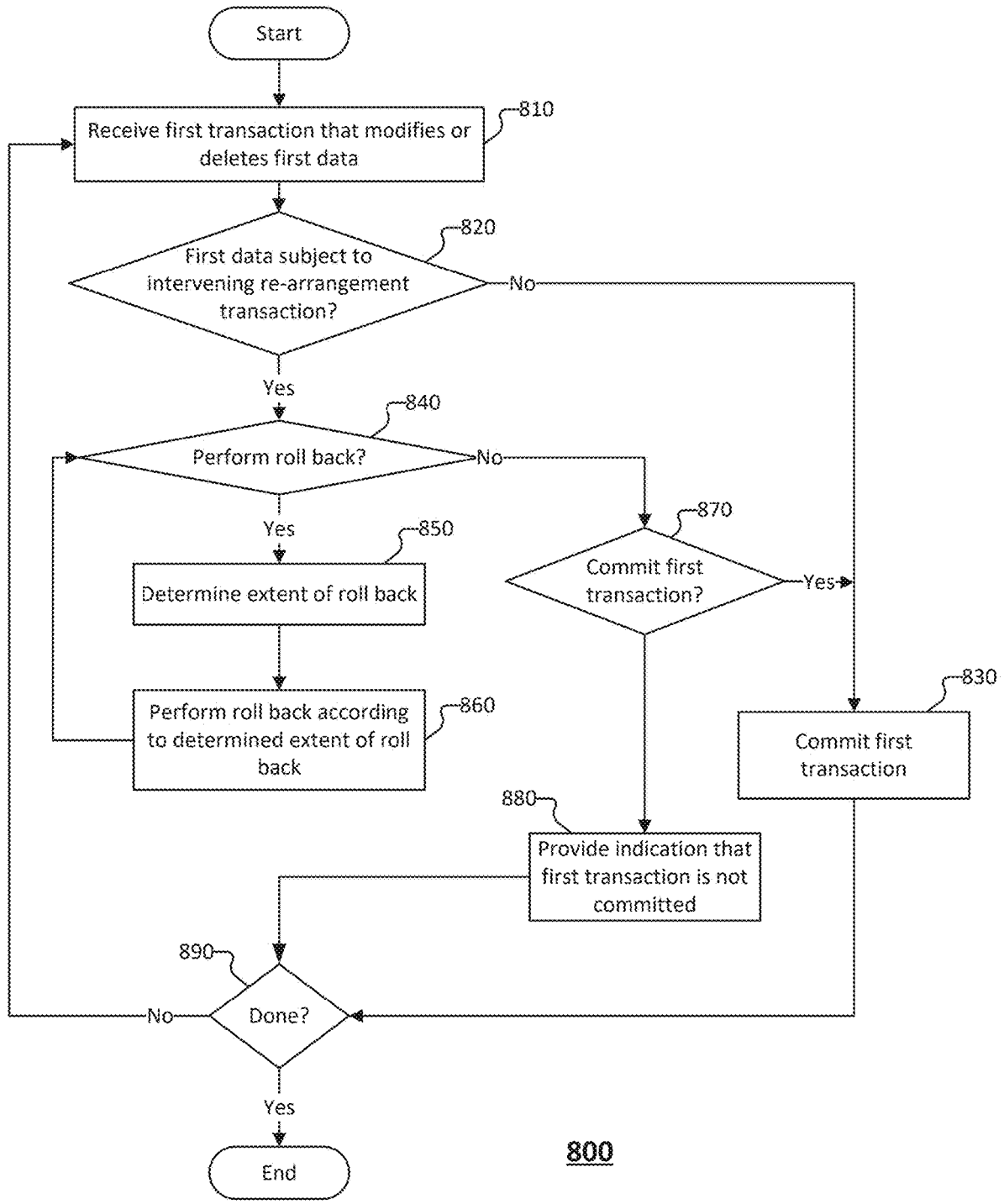
FIG. 8 is a flow diagram of a method for handling a transaction among intervening re-arrangement transactions according to various embodiments of the present application.

FIG. 8 is a flow diagram of a method for handling a transaction among intervening re-arrangement transactions according to various embodiments of the present application. In some embodiments, process 800 is implemented at least in part by system 100 of FIG. 1 (e.g., file system service 110), and/or system 200 of FIG. 2. In some embodiments, process 800 is implemented in connection with process 500 of FIG. 5, process 600 of FIG. 6, process 700 of FIG. 7, and/or process 800 of FIG. 8.

At 810, a first transaction that modifies or deletes first data is received. In some embodiments, the first transaction is invoked in connection with an active transaction (e.g., a request or task that was received at an earlier time). The first transaction may be a business transaction that attempts to access the first data. In some embodiments, the first data corresponds to one or more files. As an example, the one or more files are located in a same dataset. As another example, the first data corresponds to a plurality of files that are respectively located in different datasets. In some embodiments, in response to receiving the first transaction, the system determines the first data. For example, the system receives the first transaction and determines data that is to be impacted by the first transaction.

At 820, a determination is made as to whether the first data is subject to an intervening re-arrangement transaction. In some embodiments, 820 corresponds to, or is similar to, 520 of process 500 of FIG. 5.

In response to determining that first data is not subject to an intervening re-arrangement transaction (e.g., that an intervening re-arrangement transaction is not being performed contemporaneous with the first transaction) at 820, process 800 proceeds to 830 at which the first transaction is committed. In some embodiments, the committing the first transaction comprises performing an operation corresponding to the first transaction to the first data (e.g., and storing a result).

In response to determining that first data is subject to an intervening re-arrangement transaction (e.g., that an intervening re-arrangement transaction is being performed contemporaneous with the first transaction) at 820, process 800 proceeds to 840 at which a determination is made as to whether to perform a rollback. In some embodiments, the determining whether to perform the rollback includes determining whether to rollback the intervening re-arrangement transaction at least with respect to the first data. For example, the system determines whether to partially rollback the intervening re-arrangement transaction with respect to a particular set of one or more records (e.g., the first data and any other data subject to a conflicting business transaction, if any, etc.).

In response to determining to perform the rollback at 840, process 800 proceeds to 850 at which an extent of the rollback is determined. In some embodiments, the system determines whether to perform a partial rollback or a full rollback based on whether an extent of the first data relative to the data subject to the intervening re-arrangement transaction exceeds a predefined threshold. In some embodiments, the system determines whether to perform a partial rollback or a full rollback based at least in part on a user input (e.g., a user selects between the partial rollback or full rollback in connection with being prompted in response to a determination that a rollback is to be performed/proposed, etc.).

In some embodiments, the system determines whether to perform a partial rollback or a full roll based at least in part on one or more conflict policies (or rollback policies). Examples of the one or more conflict policies include one or more of: (i) rolling back the compaction by default in response to detecting a conflict between a business transaction and an intervening compaction, (ii) rolling back the compaction provided that an extent of a change in the state of the dataset does not exceed a predetermined rollback threshold, (iii) allowing a business transaction to fail in response to a determination that the extent of a change in the state of the dataset exceeds (or is equal to) a predetermined rollback threshold, (iv) prompting a user to confirm or authorize a proposed compaction that is determined in response to detection of the conflict between a business transaction and an intervening compaction, (v) using the relative priorities corresponding to the business transaction and the compaction, and using a higher priority to determine which transaction to commit, (vi) a threshold number (or percentage) of files that were subject to compaction are deemed to be impacted by the one or more business transactions and thus subject to rollback, etc. Various other policies or conditions may be implemented in connection with the one or more conflict policies.

At 860, the rollback is performed according to the determined extent of the rollback. Thereafter, process 800 returns to 840. In some embodiments, process 800 may proceed to 830 and/or 870 directly after 860.

At 870, a determination is made as to whether to commit the first transaction.

In response to determining to commit the first transaction at 870, process 800 proceeds to 830 at which the first transaction is committed.

In response to determining not to commit the first transaction at 870, process 800 proceeds to 880 at which an indication that the first transaction is not committed is provided.

At 890, a determination is made as to whether process 800 is complete. In some embodiments, process 800 is determined to be complete in response to a determination that no further transactions that modify data exists, no further transactions that include accessing data exists, a user has indicated that no further transactions are to be committed with respect to a dataset, no further records (e.g., files) are to be compacted, the user has exited the system, an administrator indicates that process 800 is to be paused or stopped, etc. In response to a determination that process 800 is complete, process 800 ends. In response to a determination that process 800 is not complete, process 800 returns to 810.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits, programmable logic devices, and ROM and RAM devices. Examples of program code include both machine code, as produced, for example, by a compiler, or files containing higher level code, for example, a script that can be executed using an interpreter.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
   receiving a transaction to modify first data stored in a storage system;
   determining that the first data has been compacted with other data during an intervening re-arrangement transaction which yields compacted data;
   determining to rollback the intervening re-arrangement transaction; and
   in response to determining to rollback the intervening re-arrangement transaction:
      removing the first data from the compacted data, and
      committing the transaction to modify the first data.

2. The method of claim 1, where determining to rollback the intervening re-arrangement transaction comprises:
   determining a priority level associated with the transaction to modify the first data; and
   determining that the priority level associated with the transaction to modify the first data meets or exceeds a threshold priority level.

3. The method of claim 2, wherein the priority level associated with the transaction to modify the first data is determined based on at least one of: a type of the transaction, a type of the first data being modified by the transaction, a directory in which the first data is stored, and a dataset to which the first data belongs.

4. The method of claim 1, where determining to rollback the intervening re-arrangement transaction comprises:
   determining that a cost associated with re-executing the transaction to modify the first data is greater than a cost associated with rolling back the intervening re-arrangement transaction.

5. The method of claim 1, where determining to rollback the intervening re-arrangement transaction comprises:
   generating, at a client device, a prompt to authorize executing the rollback of the intervening re-arrangement transaction to commit the transaction; and
   receiving, from the client device, a response to the prompt that authorizes execution of the rollback of the intervening re-arrangement transaction to commit the transaction.

6. The method of claim 1, where determining to rollback the intervening re-arrangement transaction comprises:
   determining an impact value indicating the impact of rolling back the intervening re-arrangement transaction; and
   determining that the impact value indicating the impact of rolling back the intervening re-arrangement transactional is less than a threshold impact value.

7. The method of claim 6, wherein the impact value indicating the impact of rolling back the intervening re-arrangement transaction is determined based on at least one of: a number of data files that are compacted into the compacted data, a number of rollback operations that have to be performed to rollback the intervening re-arrangement transaction, a size of the first data in respect to a size of the compacted data, and an extent to which the compaction of the first data and the other data has to be performed.

8. The method of claim 1, wherein removing the first data from the compacted data comprises:
   updating an index mapping of data stored by the storage system to indicate that the first data has been moved to a location of the first data before the intervening re-arrangement transaction.

9. A system comprising:
   one or more computer processors; and
   one or more computer-readable mediums storing instructions that, when executed by the one or more computer processors, cause the system to perform operations comprising:
      receiving a transaction to modify first data stored in a storage system;

determining that the first data has been compacted with other data during an intervening re-arrangement transaction which yields compacted data;
determining to rollback the intervening re-arrangement transaction; and
in response to determining to rollback the intervening re-arrangement transaction:
  removing the first data from the compacted data, and committing the transaction to modify the first data.

10. The system of claim 9, where determining to rollback the intervening re-arrangement transaction comprises:
  determining a priority level associated with the transaction to modify the first data; and
  determining that the priority level associated with the transaction to modify the first data meets or exceeds a threshold priority level.

11. The system of claim 10, wherein the priority level associated with the transaction to modify the first data is determined based on at least one of: a type of the transaction, a type of the first data being modified by the transaction, a directory in which the first data is stored, and a dataset to which the first data belongs.

12. The system of claim 9, where determining to rollback the intervening re-arrangement transaction comprises:
  determining that a cost associated with re-executing the transaction to modify first data is greater than a cost associated with rolling back the intervening re-arrangement transaction.

13. The system of claim 9, where determining to rollback the intervening re-arrangement transaction comprises:
  generating, at a client device, a prompt to authorize executing the rollback of the intervening re-arrangement transaction to commit the transaction; and
  receiving, from the client device, a response to the prompt that authorizes execution of the rollback of the intervening re-arrangement transaction to commit the transaction.

14. The system of claim 9, where determining to rollback the intervening re-arrangement transaction comprises:
  determining an impact value indicating the impact of rolling back the intervening re-arrangement transaction; and
  determining that the impact value indicating the impact of rolling back the intervening re-arrangement transactional is less than a threshold impact value.

15. The system of claim 14, wherein the impact value indicating the impact of rolling back the intervening re-arrangement transaction is determined based on at least one of: a number of data files that are compacted into the compacted data, a number of rollback operations that have to be performed to rollback the intervening re-arrangement transaction, a size of the first data in respect to a size of the compacted data, and an extent to which the compaction of the first data and the other data has to be performed.

16. A non-transitory computer-readable medium storing instructions that, when executed by one or more computer processors of a computing system, cause the computing system to perform operations comprising:
  receiving a transaction to modify first data stored in a storage system;
  determining that the first data has been compacted with other data during an intervening re-arrangement transaction which yields compacted data;
  determining to rollback the intervening re-arrangement transaction; and
  in response to determining to rollback the intervening re-arrangement transaction:
    removing the first data from the compacted data, and committing the transaction to modify the first data.

17. The non-transitory computer-readable medium of claim 16, where determining to rollback the intervening re-arrangement transaction comprises:
  determining a priority level associated with the transaction to modify the first data, wherein the priority level associated with the transaction to modify the first data is determined based on at least one of: a type of the transaction, a type of the first data being modified by the transaction, a directory in which the first data is stored, and a dataset to which the first data belongs; and
  determining that the priority level associated with the transaction to modify the first data meets or exceeds a threshold priority level.

18. The non-transitory computer-readable medium of claim 16, where determining to rollback the intervening re-arrangement transaction comprises:
  determining that a cost associated with re-executing the transaction to modify the first data is greater than a cost associated with rolling back the intervening re-arrangement transaction.

19. The non-transitory computer-readable medium of claim 16, where determining to rollback the intervening re-arrangement transaction comprises:
  generating, at a client device, a prompt to authorize executing the rollback of the intervening re-arrangement transaction to commit the transaction; and
  receiving, from the client device, a response to the prompt that authorizes execution of the rollback of the intervening re-arrangement transaction to commit the transaction.

20. The non-transitory computer-readable medium of claim 16, where determining to rollback the intervening re-arrangement transaction comprises:
  determining an impact value indicating the impact of rolling back the intervening re-arrangement transaction, wherein the impact value indicating the impact of rolling back the intervening re-arrangement transaction is determined based on at least one of: a number of data files that are compacted into the compacted data, a number of rollback operations that have to be performed to rollback the intervening re-arrangement transaction, a size of the first data in respect to a size of the compacted data, and an extent to which the compaction of the first data and the other data has to be performed; and
  determining that the impact value indicating the impact of rolling back the intervening re-arrangement transactional is less than a threshold impact value.

* * * * *